United States Patent
Elsemore et al.

(10) Patent No.: US 9,584,769 B2
(45) Date of Patent: Feb. 28, 2017

(54) MULTI-AXIS CAMERA SURVEILLANCE APPARATUS

(71) Applicant: BGHA, Inc., Windom, MN (US)

(72) Inventors: Perry Vincent Elsemore, Saxon, WI (US); Hans Carl Anderson, Bloomington, MN (US)

(73) Assignee: BGHA, Inc., Windom, MN (US)

( * ) Notice: Subject to any disclaimer, the term of this patent is extended or adjusted under 35 U.S.C. 154(b) by 354 days.

(21) Appl. No.: 13/942,911

(22) Filed: Jul. 16, 2013

(65) Prior Publication Data

US 2014/0015968 A1    Jan. 16, 2014

Related U.S. Application Data

(60) Provisional application No. 61/672,027, filed on Jul. 16, 2012.

(51) Int. Cl.
*H04N 7/18* (2006.01)
*G03B 17/00* (2006.01)
*H04N 5/232* (2006.01)

(52) U.S. Cl.
CPC ............... *H04N 7/18* (2013.01); *H04N 5/232* (2013.01); *H04N 5/23241* (2013.01)

(58) Field of Classification Search
CPC ....... H04N 5/23241; H04N 5/232; H04N 7/18
See application file for complete search history.

(56) References Cited

U.S. PATENT DOCUMENTS

| | | | | |
|---|---|---|---|---|
| 6,124,892 A | * | 9/2000 | Nakano | F16M 11/10 348/373 |
| 2007/0126872 A1 | * | 6/2007 | Bolotine | G08B 13/19619 348/151 |
| 2010/0208068 A1 | * | 8/2010 | Elsemore | A01M 31/002 348/143 |
| 2012/0169842 A1 | * | 7/2012 | Chuang | G08B 13/19619 348/39 |
| 2013/0163976 A1 | * | 6/2013 | Pierce | G03B 17/02 396/427 |
| 2013/0222581 A1 | * | 8/2013 | Wydner | H04N 5/23238 348/143 |

* cited by examiner

*Primary Examiner* — Dave Czekaj
*Assistant Examiner* — Tsion B Owens
(74) *Attorney, Agent, or Firm* — Kagan Binder, PLLC

(57) ABSTRACT

Remote usable surveillance apparatuses are provided with at least a single camera head and preferably with the ability to provide adjustment about one or more axis. The present invention also solves several other problems faced by designs with fixed (non-moveable) axis imaging systems. Those include but are not limited to supplying power to a camera head that tilts and rotates, particularly at a remote location. The ability of the user to interface with camera functions and setting using a tilting head, multiple power supplies and options built into a single housing without the addition of power cables or external jacks. The present invention provides a standalone concept without the aid of one or even more mounting apparatuses or devices which in turn sets it apart and creates a totally different multi-axis concept from prior art.

16 Claims, 28 Drawing Sheets

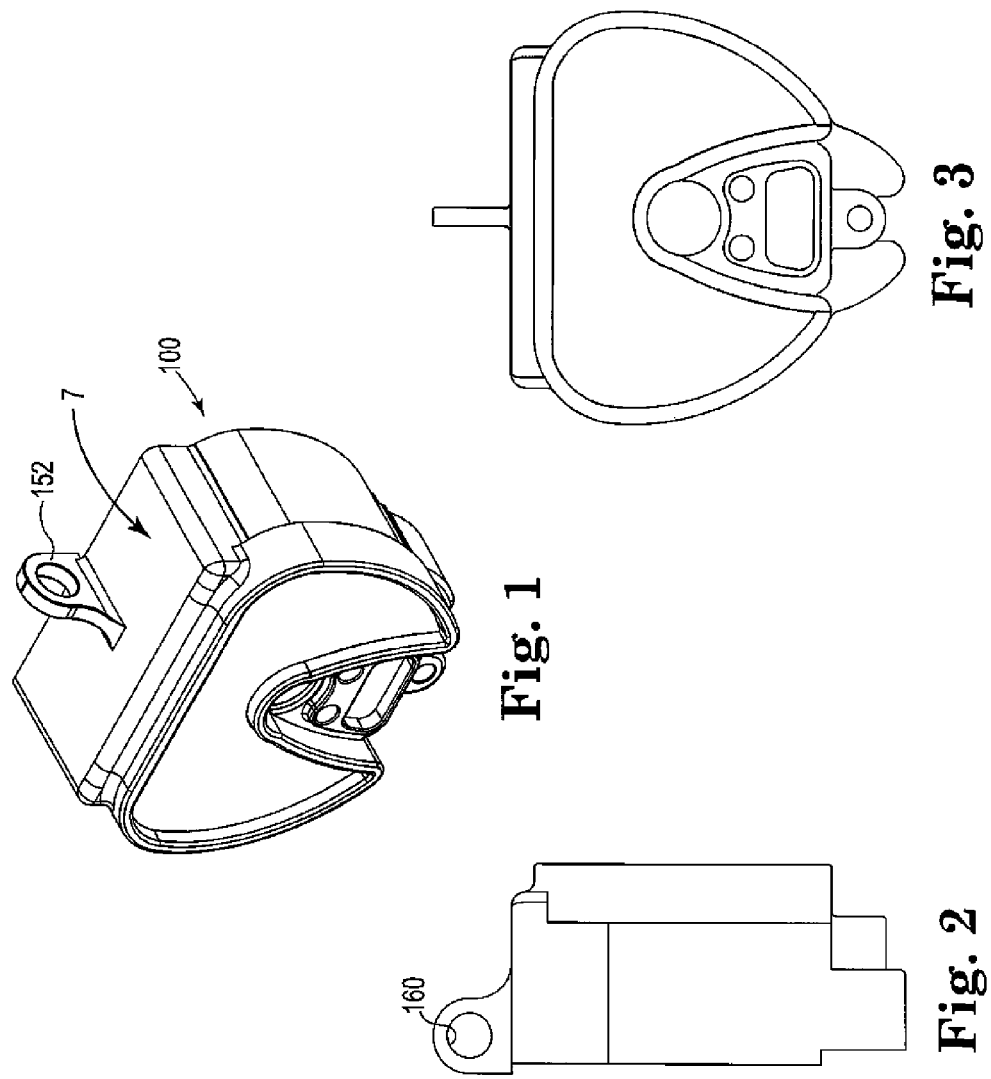

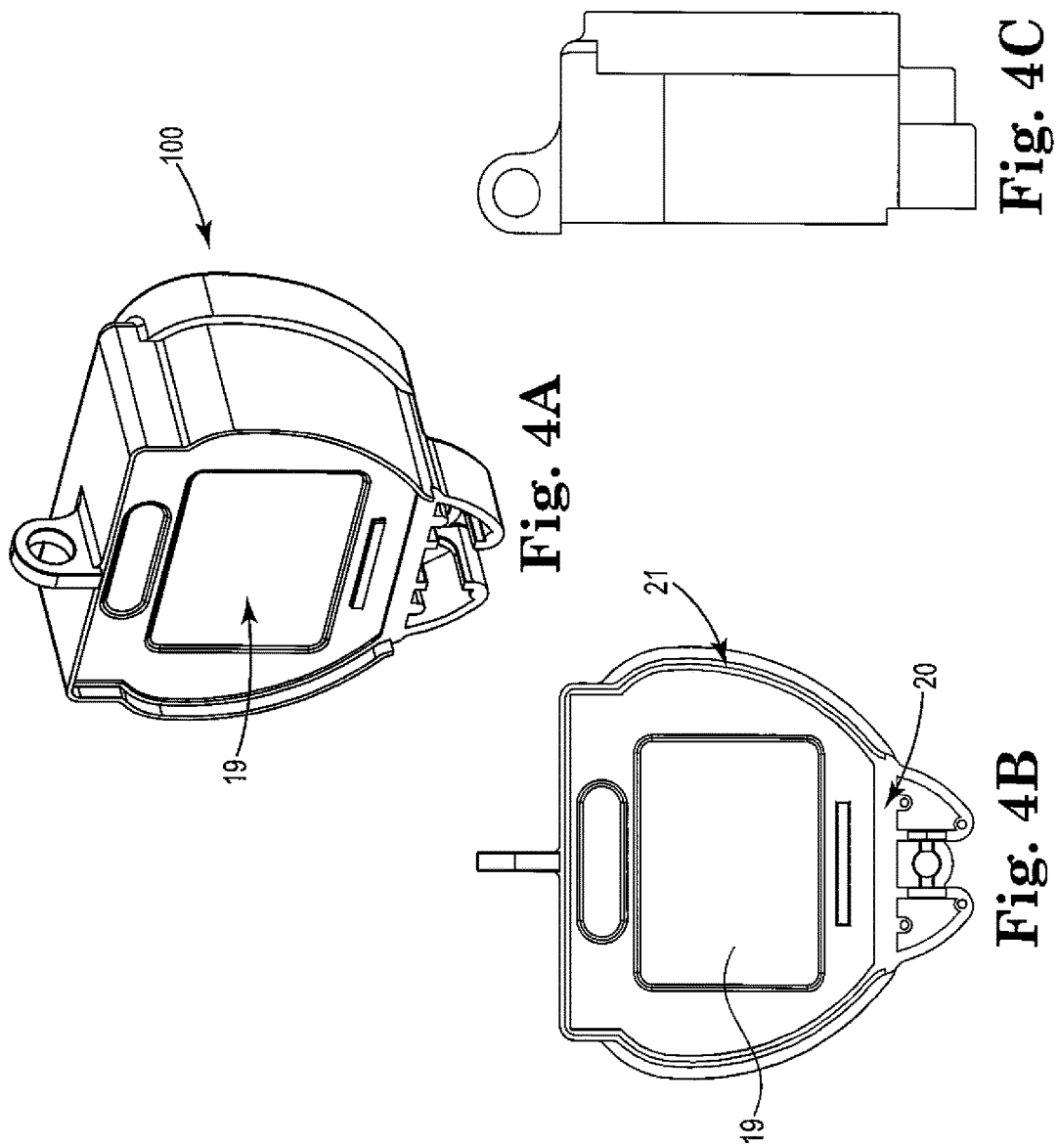

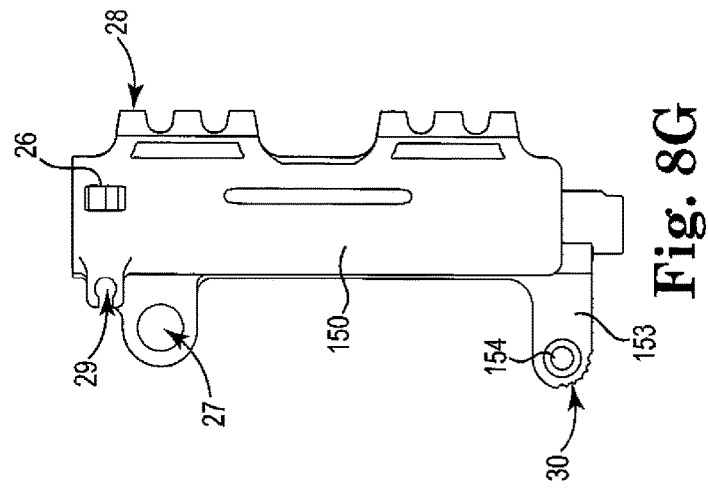
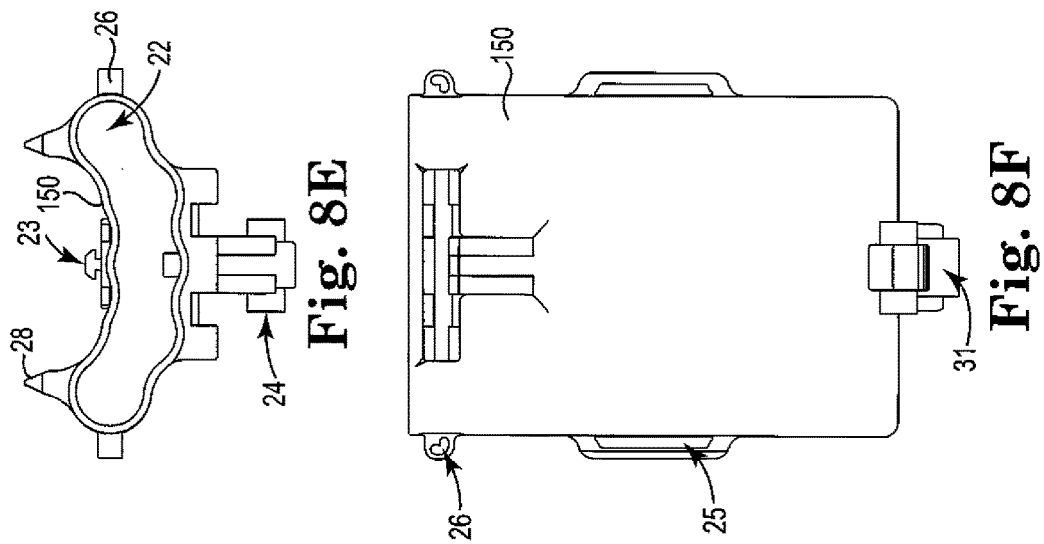

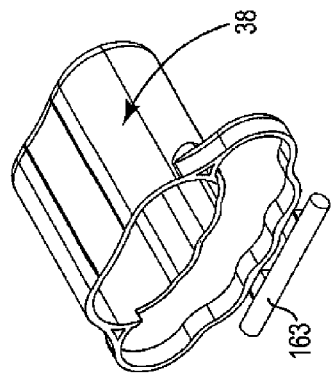 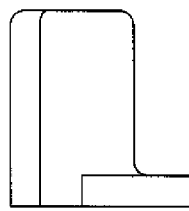 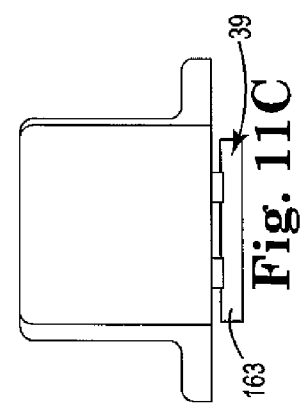
Fig. 11A  Fig. 11B  Fig. 11C
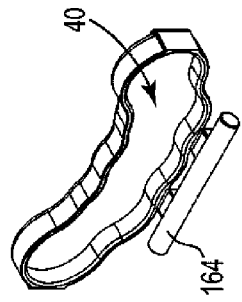 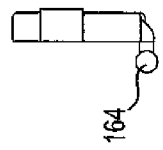 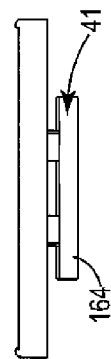
Fig. 12A  Fig. 12B  Fig. 12C

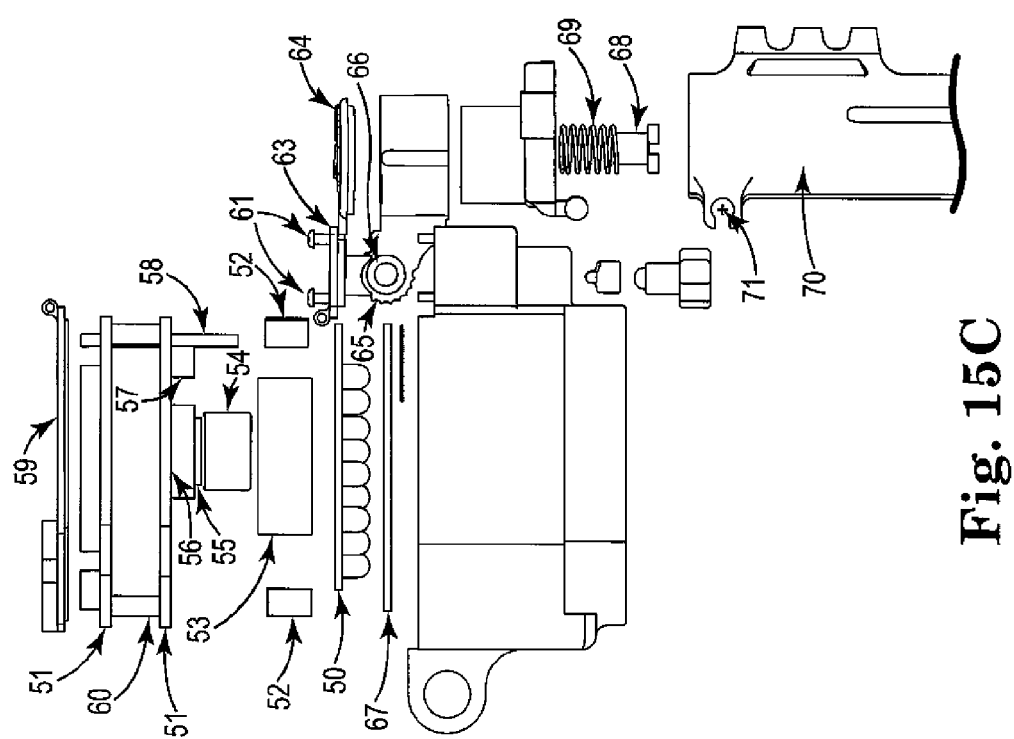

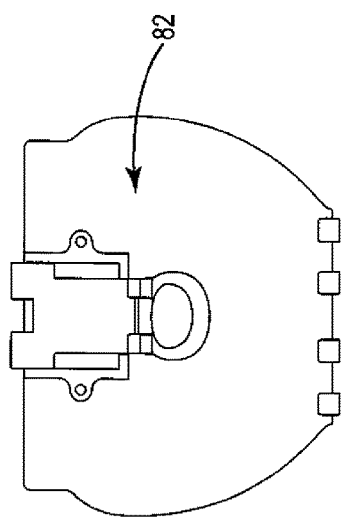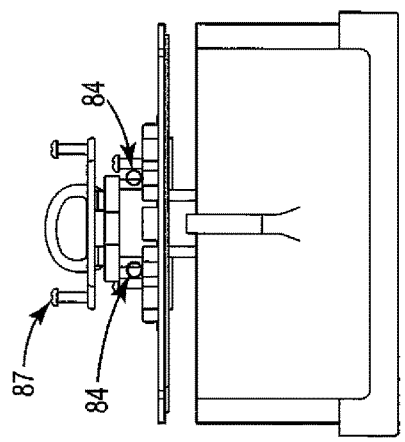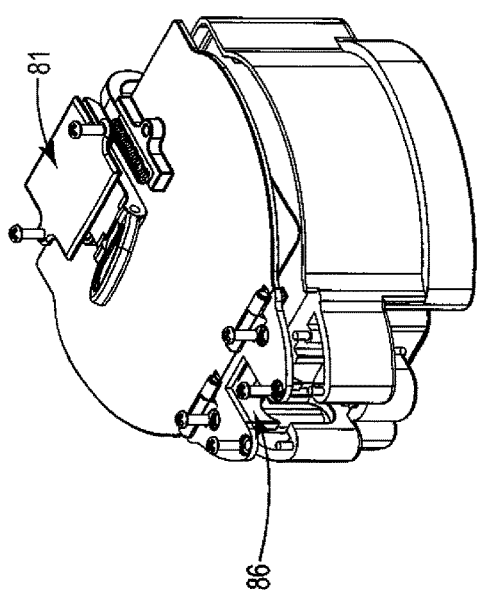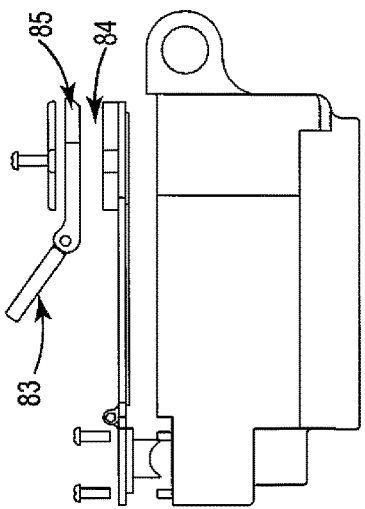

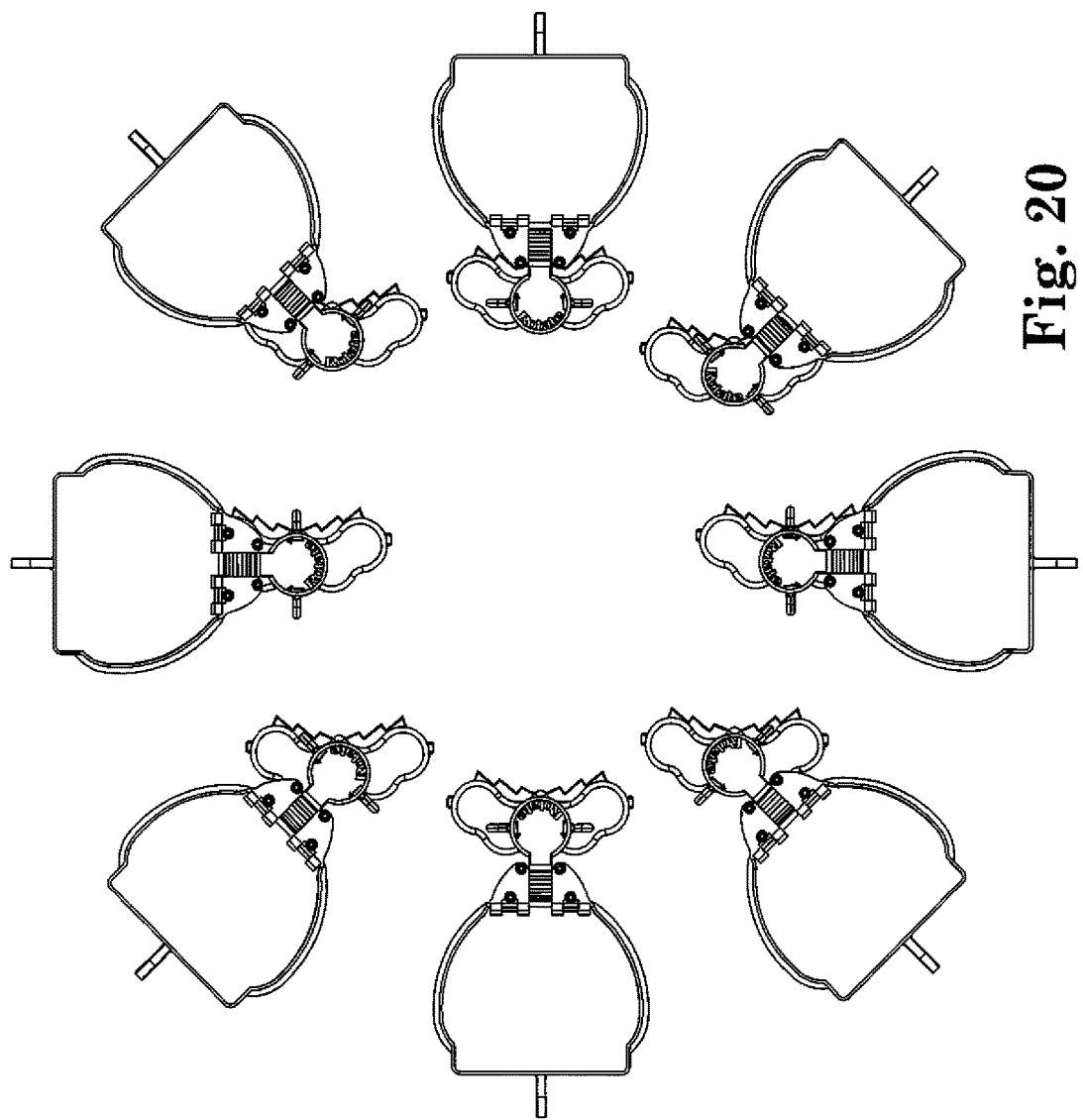

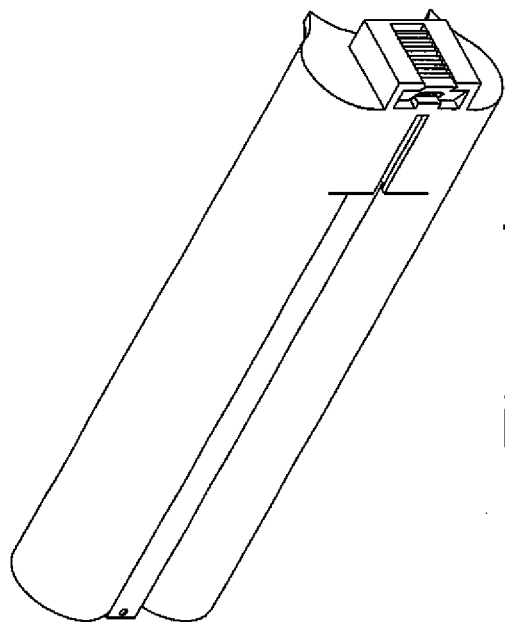
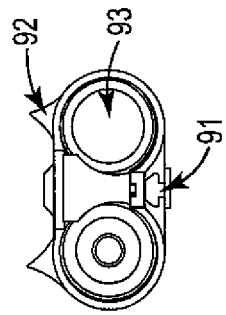
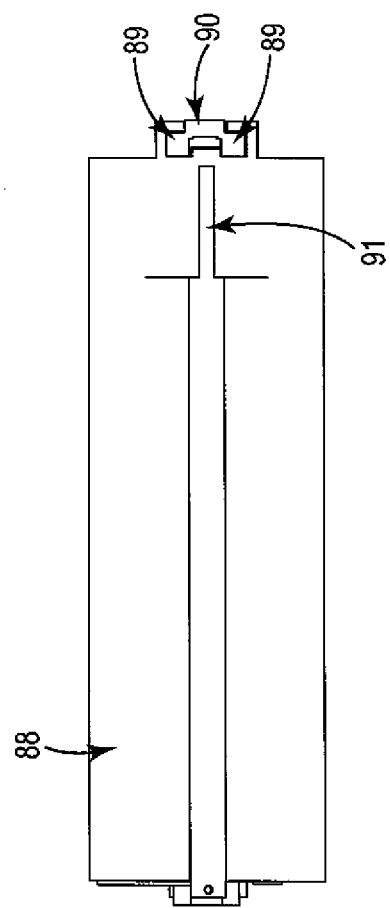
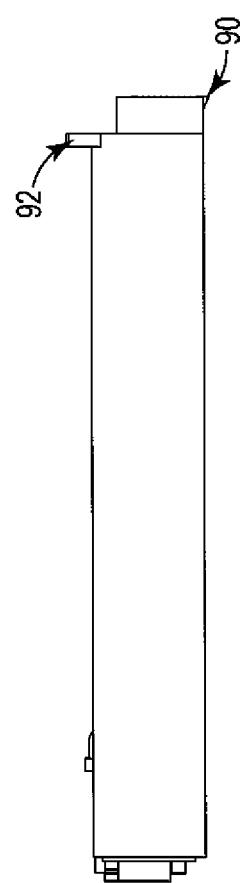
Fig. 21A
Fig. 21D
Fig. 21B
Fig. 21C

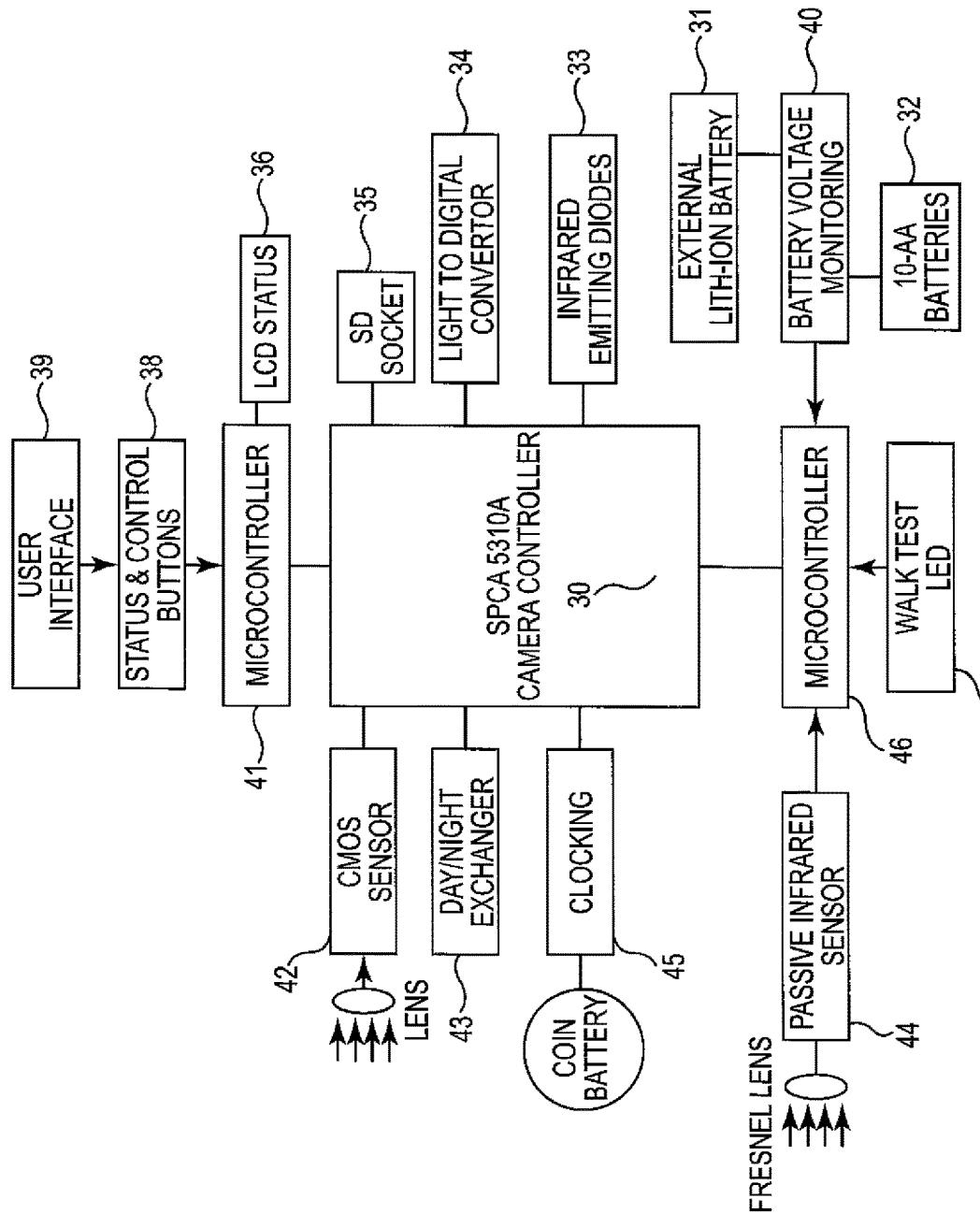

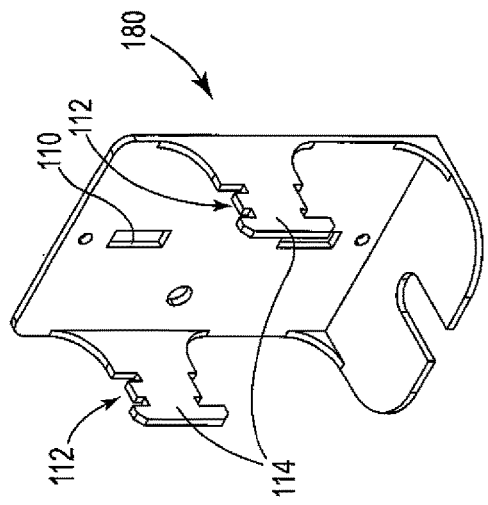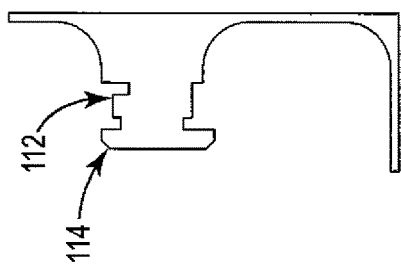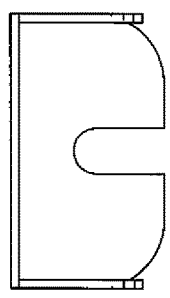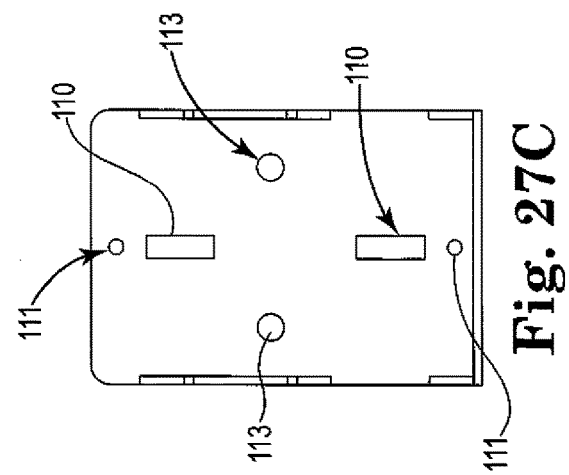
Fig. 27A
Fig. 27B
Fig. 27D
Fig. 27C

MULTI-AXIS CAMERA SURVEILLANCE APPARATUS

CROSS REFERENCE TO RELATED APPLICATION

This application claims the benefit under 35 U.S.C. §119 (e) of U.S. Provisional Patent Application No. 61/672,027, filed Jul. 16, 2012 and titled "MULTI-AXIS CAMERA SURVEILLANCE APPARATUS", which is incorporated herein by reference in its entirety.

TECHNICAL FIELD

The present invention relates to novel and unique surveillance apparatuses, systems, and methods of constructing and utilizing same. In particular, the present invention is directed to devices, systems and methods for surveillance including the use of one or more cameras having multi-axis adjustability and functionality.

BACKGROUND OF THE INVENTION

In the surveillance industry, including but not limited to home and/or business surveillance and animal/game/trail surveillance, conventional fixed (non-moveable) axis, fixed board mounted cameras can detect motion only up to approximately 60 degrees dependant only on the (FOV) field of view from the camera lens, and are not capable of 360 degree horizontal or 90 degree vertical movement whatsoever.

Surveillance systems have been developed that utilize one or more cameras as imaging devices, which cameras are typically mounted in opporture locations for periodically or continual surveillance. Such systems may take images at regular intervals or may be triggered by movement or other sensors. The cameras are mounted to be pointed to a specific location and may include adjustability in the setting up of the camera to view a desired location.

In the case of surveillance equipment that is mounted to a building or facility, cameras are typically hard-wired to a system, which wiring includes a power supply. Power can be provided to run the camera and any sensors used to trigger the camera.

In the case of remote surveillance systems, such as can be set up at remote locations not having a power connect, batteries must provide power to operate the camera and any sensors. The long term supply of power or the supply of greater power than needed for simple camera and sensor operation is a problem and dependent on the quantity of battery power that is available as supplied. Battery power is limited not only in time but also in the degree of power available to operate devices.

The present invention solves the aforementioned problems and shortcomings of the prior art, and also provides multi-axis apparatuses and systems, which can be used full-time under all types of light conditions, day and night.

SUMMARY OF THE PRESENT INVENTION

Multiple axis surveillance systems of the present invention can comprise one or more pyroelectric sensors, which receive infrared radiation transmissions created from human and or animal body heat. Such an infrared signal can be configured through a Fresnel lens into the pyroelectric sensors, which in turn can send a signal to activate the camera, and depending on the user settings, to capture either video or still images.

In one aspect of the present invention, shortcomings and disadvantages of conventional and prior art techniques and systems are overcome by providing unlimited movement and mounting options along with energy-efficient surveillance apparatuses and systems.

More particularly, a first embodiment of present invention relates to a surveillance apparatus with at least a single camera head and a multi-axis system with the ability to tilt the head vertically, preferably from 0-90 degrees, and if desired rotating horizontally by preferably a full 360 degrees at the time in any direction. The present invention also solves several other problems faced by designs with fixed (non-moveable) axis imaging systems. Those include but are not limited to supplying power to a camera head that tilts and rotates, particularly at a remote location. The ability of the user to interface with camera functions and setting using a tilting head, multiple power supplies and options built into a single housing without the addition of power cables or external jacks. The present invention provides a standalone concept without the aid of one or even more mounting apparatuses or devices which in turn sets it apart and creates a totally different multi-axis concept from prior art.

The present invention also provides in another aspect, a self-contained surveillance apparatus preferably comprising: a water-tight case; a 90-degree vertical tilt and 360-degree horizontal rotational camera head in said case; a camera controller mounted in said case; an internal and external battery supply mounted in said case; one or more infrared diodes mounted in said case; one or more passive infrared sensors mounted in said case; a day/night exchanger mounted in said case; a secure digital (SD, SDHC) socket mounted in said case; multiply rubber buttons, tact switches and LCD screen interface options mounted in said case.

The present invention provides a camera controller recording system and apparatus for 24-hour home or business security, surveillance, and to monitor and detect animal movements.

It is another object of the present invention to provide a home/game/trail/wildlife/camera surveillance system providing and allowing movement of an imaging device to a completely adjustable 0-90-degree vertical tilt and 360-degree horizontal rotation, which also encompasses the camera (FOV) field of view and a passive infrared detection zone.

Another embodiment of the invention provides a single axis self-contained surveillance system, comprising: one or more pyroelectric sensors, which can receive infrared radiation transmissions created from human and or animal body heat. An infrared signal can be configured through a Fresnel lens into the pyroelectric sensors which in turn can send a signal to activate the camera depending on the user settings to capture either video or still images.

The present invention, in another aspect, also provides a self-contained surveillance apparatus, preferably comprising: a water-tight case; a single axis 0-90-degree vertical tilting camera head in said case; a camera controller mounted in said case; an internal and external battery supply mounted in said case; one or more infrared diodes mounted in said case; one or more passive infrared sensors mounted in said case; a day/night exchanger mounted in said case; a secure digital (SD, SDHC) socket mounted in said case; multiple rubber buttons, tact switches and LCD user interface screen options mounted in said case.

The present invention can advantageously provide a digital image recording system and apparatus that is effectively usable for 24-hour home or business security, surveillance, and to monitor and detect animal movements. In accordance with another aspect of the present invention, this functionality can be achieved at remote locations without the need for a hard-wired power supply.

It is yet another object of the present invention to provide a home/game/trail/wildlife camera surveillance system providing at least a single axis adjustable vertical preferably 0-90-degree tilting camera head which also encompasses the camera (FOV) field of view and passive infrared detection zone.

Yet another embodiment of the invention provides a multiple axis multiple camera head shelf contained surveillance system preferably comprising: one or more pyroelectric sensors, which receive infrared radiation transmissions created from human and or animal body heat. An infrared signal can be configured through a Fresnel lens into the pyroelectric sensors, which in turn sends a signal to activate the camera depending on the user settings to capture either video or still images.

The present invention, in yet another aspect, provides a self-contained surveillance apparatus preferably comprising: a water-tight case; multiple axis camera heads capable of 0-90-degree tilt and 360-degree rotation in said case; a digital camera controller mounted in said case; and internal and external battery supply mounted in said case; one or more infrared diodes mounted in said case; one or more passive infrared sensors mounted in said case; a day/night exchanger mounted in said case; a secure digital (SD, SDHC) socket mounted in said case; multiple rubber buttons, tact switches and LCD user interface screen options mounted in said case.

The present invention can advantageously provide a digital image recording system and apparatus that is effectively usable for 24-hour home or business security, surveillance, and to monitor and detect animal movements. In accordance with another aspect of the present invention, this functionality can be achieved at remote locations without the need for a hard-wired power supply.

It is yet another object of the present invention to provide a home/game/trail/wildlife camera surveillance system providing and allowing multiple axis movement to multiple camera heads which also encompasses the camera (FOV) field of view and passive infrared detection zone.

Other objects, advantages, and features of the present inventions will become apparent to those persons skilled in this particular area of multiple axis technology and to other persons after having been exposed to the present patent application when read in conjunction with the accompanying patent drawings.

BRIEF DESCRIPTION OF THE DRAWINGS

FIG. 1 is a front perspective view of a self-contained surveillance apparatus/system in accordance with multiple embodiments of the present invention.

FIG. 2 is a side elevation view as viewed from the left of the apparatus as depicted in FIG. 1.

FIG. 3 is a front elevation view of the apparatus of FIG. 1.

FIG. 4A is a rear perspective view of a self-contained surveillance apparatus/system such as that of FIG. 1 that is also in accordance with various embodiments of the present invention.

FIG. 4B is a rear elevation of the apparatus of FIG. 4A.

FIG. 4C is a side elevation view as viewed from the left of the apparatus as depicted in FIG. 4.

FIGS. 8E, 8F, 8G are a continuation of further detailed views of the apparatus of FIG. 8A illustrating features of a camera and battery compartment housing in accordance with the present invention and as shown without a camera head.

FIG. 11A is a rear perspective view of components of a self-contained surveillance apparatus/system in accordance with yet another embodiment of the present invention using external batteries.

FIG. 11B is a side elevation view as viewed from the left of the apparatus as depicted in FIG. 11A.

FIG. 11C is a front elevation view of the apparatus of FIG. 11A.

FIG. 12A is a rear perspective view of a component of the apparatus in accordance with the embodiment of FIG. 9A of the present invention, like FIG. 11A, but without external batteries.

FIG. 12B is a side elevation view as viewed from the left of the apparatus as depicted in FIG. 12A.

FIG. 12C is a front elevation view of the apparatus of FIG. 12A.

FIG. 15C is a side elevation view exploded as viewed from the left of the apparatus as depicted in FIG. 14A apparatus.

FIG. 18A is rear perspective elevation view of a camera head usable in camera apparatuses of the present invention including those as shown in apparatus embodiments of FIGS. 6A, 8A, 14A.

FIG. 18B is a rear elevation view of the apparatus of FIG. 18A.

FIG. 18C is a side elevation view of the apparatus of FIG. 18A.

FIG. 18D is bottom plan view of the apparatus of FIG. 18A.

FIG. 20 is top view of an apparatus of the present invention, such as is depicted in FIGS. 6A, 14A showing a full ability for rotational positioning of a camera head in accordance with an aspect of the present invention.

FIG. 21A is front perspective elevation view of an external battery pack power supply in accordance with another aspect of the apparatus as depicted in FIG. 8A.

FIG. 21B is back view of the device of FIG. 21A.

FIG. 21C is a side elevation view as viewed from the right side of the device of FIG. 21A.

FIG. 21D is top view thereof.

FIG. 24 represents a schematic block diagram of camera components that can be utilized within apparatuses and systems of the present invention.

FIG. 27A is front perspective view of a quick mount detachable multi-surface mounting bracket apparatus/system in accordance another aspect of the present invention.

FIG. 27B is a side elevation view as viewed from the right side of the device of FIG. 27A.

FIG. 27C is a front elevation view of the device of FIG. 27A.

FIG. 27D is top view of the device of FIG. 27A.

DETAILED DESCRIPTION OF THE PREFERRED EMBODIMENTS

The present invention provides digital image recording and surveillance apparatuses, systems and methods for 24-hour home or business security, surveillance, and/or to monitor and detect animal movement at remote locations.

Figure 6B:
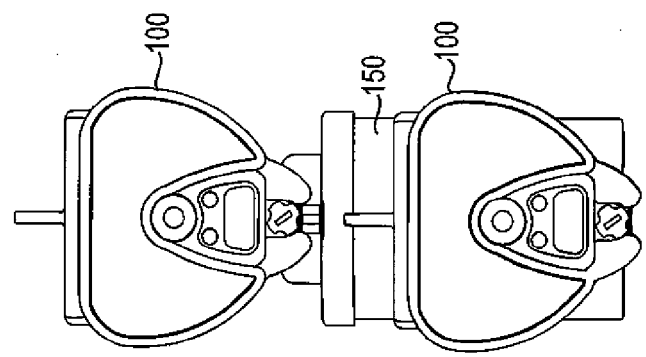
FIG. 6B is a front elevation view of the apparatus of FIG. 6A.
Figure 6C:
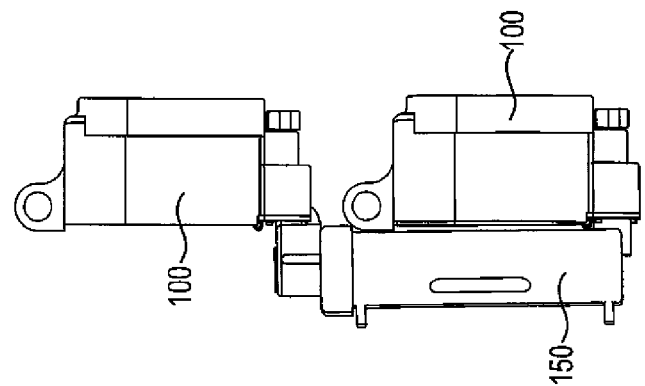
FIG. 6C is a side elevation view as viewed from the left of the FIG. 6A apparatus.
Figure 6A:
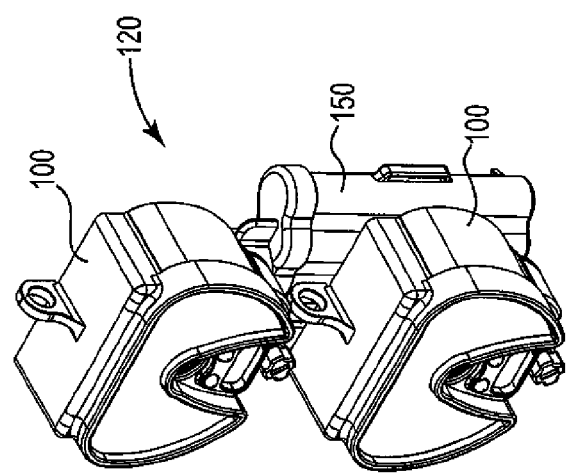
FIG. 6A is a front perspective of a remote self-contained surveillance system apparatus in accordance with an embodiment of the present invention, which apparatus comprise a combination of features including the provision of plural camera heads. This embodiment has one head that can tilt and rotate combined with another head that includes the ability for tilt.

FIG. 6A illustrates a self-contained surveillance system/apparatus 120 in accordance with a one embodiment of the present invention that provides multiple camera heads for multiple axis adjustability, preferably including at least a camera head with 0-90 degree vertical and another camera head with 360 degree rotational movement, which apparatus 120 may readily be mounted on an external structure, for example, on a tree or building.

Figure 8A:
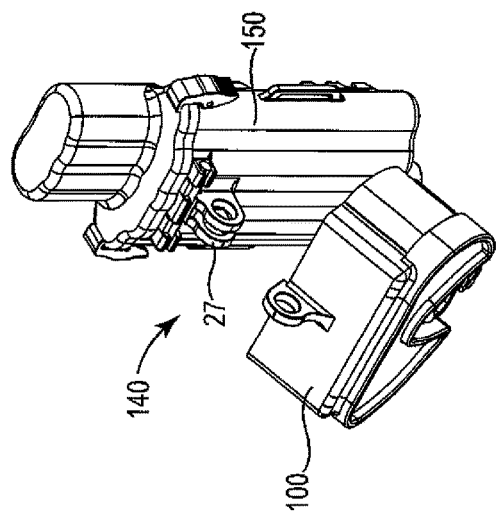
FIG. 8A is a front perspective view of another embodiment of a remote self-contained surveillance apparatus/system in accordance with the present invention.
Figure 8D:
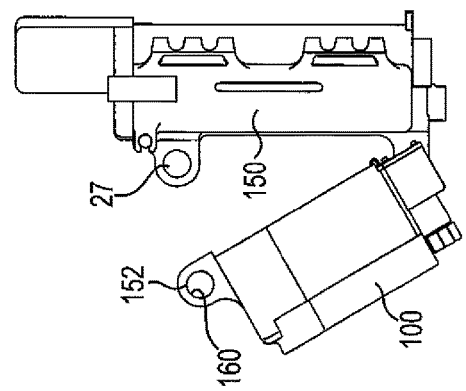
FIG. 8D is a side elevation view as viewed from the right side of the apparatus as depicted in FIG. 8A.
Figure 8B:
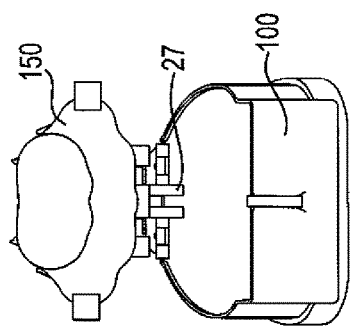
FIG. 8B is a top plan view of the apparatus of FIG. 8A.
Figure 8C:
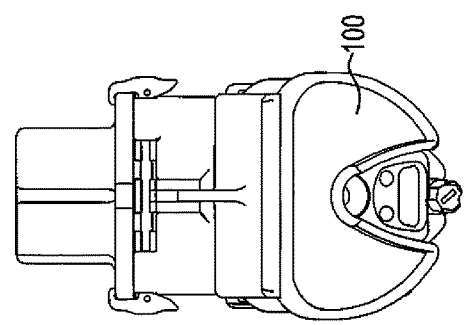
FIG. 8C is a front elevation view of the apparatus of FIG. 8A.

FIG. 8A illustrates a self-contained surveillance system/apparatus 140 in accordance with another embodiment of the present invention that provides a single axis and camera head with 0-90 degree vertical movement, which apparatus 140 may readily be mounted on an external structure, for example, on a tree or building.

Figure 14A:
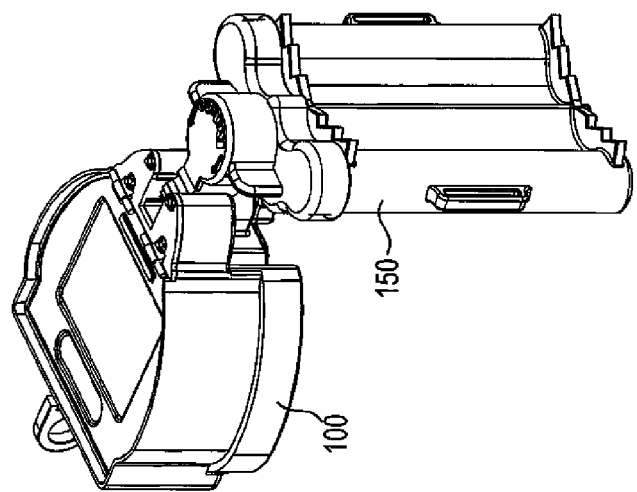
FIG. 14A is a rear perspective view of a self-contained surveillance apparatus/system 160 in accordance with yet another embodiment of the present invention.

FIG. 14A illustrates a self-contained surveillance system/apparatus 160 in accordance with another embodiment of the present invention that provides a camera head with multiple axis movement and adjustability, preferably with the camera head having 0-90 degree vertical movement and 360 degree horizontal rotational movement, which apparatus 160 may readily be mounted on an external structure, for example, on a tree or building.

Figure 5:
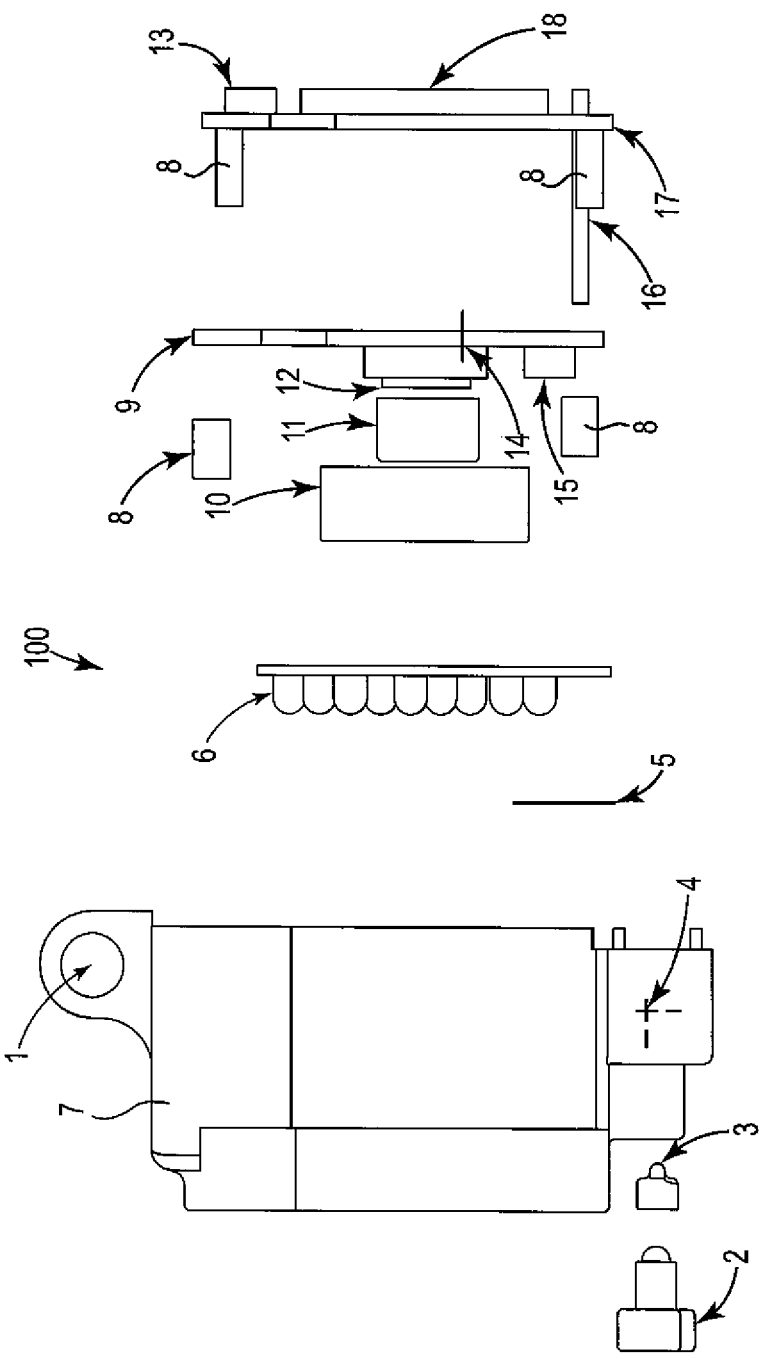
FIG. 5 is an exploded side view showing the placement of the internal camera components used in accordance with various embodiments of the present invention.

The above-noted embodiments and others in accordance with the present invention may employ the same camera head and many similar components, which will become apparent from the detailed description below, especially with regard to composite block diagram of FIG. 24, and the exploded detail view of a camera head as shown in FIG. 5.

It is perhaps easier to understand the features and the various aspects of the invention by first considering FIGS. 6A, 6B, 6C, FIGS. 8A, 8B, 8C, 8D, and FIGS. 15A, 15B, and 15C.

Below is an explanation of Block Diagram FIG. 24, which illustrates the functional relationship of various camera components and how they work and interact with each other.

Objects to be photographed must first walk into or pass through a motion detection zone, which can be generated by any type of motion detector, which preferably can comprise a Perkin Elmer Lhi-968 (PIR) passive infrared sensor (44). Body heat and radiation can be focused via a Fresnel lens, for example, into such an infrared sensor 44, such as preferably comprising a dual element (PIR) passive infrared detector. Depending on the outside ambient temperature the heat either increases or decreases on the PIR dual element surfaces, an object can be detected. The temperature variation can be sensed at the sensor 44, which in turn sends an analog signal to a microcontroller 46, that is preferably a Microchip PIC16F526 microcontroller where the signal is then converted to a digital signal that a camera controller 30 can then relay to another signal preferably to a Complementary Metal Oxide Semiconductor (CMOS) image sensor to activate and capture the image of a live moving object.

As the camera system sits in a virtual sleep mode, signals are preferably provided on a regular basis from preferably a TAOS TSL 2560 Light to Digital convertor (34), or the like, which signals are constantly monitored and updated by the camera controller 30. Those digital signals can then be sent to an image sensor 42, which keeps the sensor current with real time ambient light conditions. After information is received, such as preferably by an Aptina MT9P031 5 mp Complementary Metal-Oxide-Semiconductor (CMOS) image sensor/processor, as the image sensor 42, the image sensor/processor is able to take clear crisp images. For example on a bright sunny day, a TSL 2560 type ambient light sensor 34 can send a signal to a day/night exchange component 43 in order to place a preferably Sunex day/night exchange 43 in a proper position so as to update the image sensor 42 with the current light conditions. The same is true if it is low light or night time condition where the ambient light sensor 34 can send a signal to switch the day/night exchanger 43 and also to preferably activate at least infrared source, such as preferably a Vishay TSAL 6100 940 nm infrared emitting diodes (33) as can be provided on an infrared panel of any apparatus 120, 140, or 160. This results in images that are correctly depicted for night or day in a real time environment in color and clarity. A camera lens can be provided that may preferably comprise a Sunex DSL 934 F2.8 aperture, 52 degree viewing angle high-resolution multiple element glass lens. Preferably, but not necessarily, optional lens assemblies may be threaded into a Sunex M12-EXM-IRC21 miniature day/night exchanger 43 that covers a preferably Aptina MT9P031 5 mp 1/2.5 color image sensor (42) that interacts with the Sunex day/night exchanger (43) which permits the taking of true day/night photographs.

Preferably, the image is sent through an Aptina 5 mp 1/2.5 color low-light image sensor 42.

Preferably, but not necessarily, the images and video are processed by a SPCA 5310A Digital Still Camera Controller for high-end digital still cameras. (30). These images can then be sent and stored to a preferably secure digital (SDHC) card (35) where they can be viewed and edited when desired and as conventionally known.

An LCD viewing screen can preferably comprise a GiantPlus 2.5 diagonal 320 RGB×240 H color LCD screen (36) which an be used to view photos, video and digitally zoom, it can also be used to set date and time, camera setting and delete both still images and videos. A user interface (39) could be preferably limited to a series of rubber push buttons or tactile switches (38). By simply touching selected buttons within the user interface 39, signals can be sent that control the camera functions and settings. These settings are either stored or delivered from preferably a second microcontroller 41, preferably comprising a Microchip PIC 18F2450 Microcontroller (41).

Some embodiments of the present invention comprise both a an internal power supply 32 and an external power supply 31. Preferably, a 10-AA internal source (32) can be utilized along with an 18650 Lith-ion external (31) dual power supply. Other apparatus of the present invention may only include an internal power supply 32, such as a single 10-AA power source that supplies power to the camera head and other components. All embodiments regardless of the power supply are regulated preferably by a battery voltage monitor (40), which can constantly send an analog signal to the microcontroller 46 where the signal is then converted to digital.

A real time clock 45 is preferably provided, which can comprise a crystal (RTC) clock (45) that is used to keep accurate and current date and time. The current date and time is desirable so that each image or video can be recorded to have preferably a date and time stamp along with other information, such as moon phase. In order to maintain a constant supply of power to the RTC 45, even when one or both power supplies are removed from the camera, it is further preferable to include a small lithium coin-type battery that can be used for up to five years before it will need to be changed.

Preferably, but not necessarily, a red walk test LED (37) is provided as well that can be used as a test light for helping a user determine if the camera is pointed in a desirable direction. For example, as a user or object passes in front of the camera, a walk test LED 37 can be set to flash red as soon as motion is detected from the passive infrared sensor 44. This activation will usually first occur on the outermost limits of the PIR detection zone. Thus, by knowing where those limits are, a user can adjust the camera accordingly in the direction desired for either security purposes or animal movement.

With reference to FIGS. 6A, 8A, and 14A there are shown a variety of self-contained surveillance apparatus/systems 120, 140, 160. These embodiments are illustrated as complete and ready for mounting, for example, on a tree, post or building. Preferably, but not necessarily, all embodiments may or may not be camouflaged.

FIGS. 1, 2, 3 and 4A-C illustrate an example of a camera head that can be common to the apparatuses 120, 140, 160 as the camera head preferably includes a water-tight case 7 with a hinge portion 20 and a gasket 21. The hinge portion 20 is utilized as described below for adjustability of the camera head. Preferably, most of the functional imaging and sensing components described above with reference to FIGS. 1A, 4A are enclosed within the case 7.

FIG. 5 is an exploded view of a camera head 100 that can be common to apparatuses 120, 140, 160. The camera head 100, as illustrated in FIG. 5, can be preferably interchangeable with any embodiment of the present invention. FIGS. 6A, 8A and 14A represent different combinations and possibilities of the previous mentioned embodiments.

Preferably, but not necessarily a camera mount and security cable hole 1 is provided to the case 7 that can be used to help prevent theft at the same time secure the camera to a tree, building or similar structure. A spring loaded tension adjusting screw (2) can be provided as part of a adjustment lock mechanism and can be used to apply a force to a lock element 3. The tension screw 2 preferably is fully adjustable to where the user can apply slight pressure allowing the camera head 100 to pivot about an axis 4 and to move about the axis 4 preferably to a range up or down, more preferably with a 90 degree vertical axis range of motion. The camera head 100 can also be preferably set at a desired rotational angle, whereas the tension screw 2 can be tightened to move the gear lock element 3 into a lock position. The gear lock element 3 may provided an effective locking device by way of frictional engagement with another element or, for example, to sit in a detent or opening of another element, whereby set positions are defined. Preferably, it is desirable to be able to lock the camera head 100 in place where it cannot be moved unless the tension screw 2 is relieved.

The camera head 100 preferably houses the imaging components in a water-tight manner. Components within the case 7 of the camera head 100 preferably comprise a multi detection zone Fresnel Lens (5) that is more-preferably designed to cover at least a 70 degree (FOV) field of view. The Fresnel lens 5 also can focus radiation as picked up from living objects into the PIR passive infrared sensor (15), and more particularly the sensors heat sensitive dual elements. An infrared panel (6) is preferably configured so as to emit radiation at a certain wave length of infrared LEDs. As examples, either a Vishay TSAL-6100 940 nm LED or a Vishay TSHG-8200 850 nm LED can be used depending on the application. The LED array or infrared panel 6 is provided to emit IR radiation as controlled by the camera controller 30, such as during night time for object imaging. Preferably also and due to the small size of the camera head design, multiple printed circuit boards (9), (17) are preferably provided and arranged as shown, which circuit boards can be mounted together using four nylon stand offs (8) that also define the proper spacing.

To insure a consistent transition from color day images to black and white night images a filter exchanger (10) is placed over the camera lens (11). In order to focus the camera lens within a fixed focal length system the lens is moved either in or out as controlled by a camera lens mount (12), as known, until optimum focus is achieved. A back focal length between the lens 11 and the image sensor (14) should remain consistent as long as neither of those components change.

Preferably still images and videos are stored to a secure digital high capacity (SDHC) card which slides directly into a secure digital (SD) socket (16) Preferably because of certain space restraints, the socket 16 is mounted vertically to the printed circuit board 17. In accordance with the illustrated embodiment, there are several ways for the user to interact with the camera features and options those are a preferably rubber control buttons or tactile switches 13, and a color viewing screen or a 16×2 message board 18.

FIGS. 8E, 8F, 8G represent other embodiments of the present invention including systems/apparatuses 120, 140 that utilize a mounting device 150, that can be preferably designed for mounting a camera head 100 to a tree, for example. For mounting, as shown in FIG. 8G in particular, tree bark engagement elements 28 can be provided at upper and lower locations to help keep the mount 150 from sliding relative to tree bark (another example of bark engagement elements are shown in FIG. 14A). A cable locking structure (27) defining an aperture is preferably provided to extend from the mount 150. A pair of elements can define a slot within which a corresponding locking structure 152 of the camera head can be positioned for locking in one position. Mounting straps slots (25) are also preferably provided for securing the apparatuses 120, 140 securely to an external object, such as tree, post or building.

Preferably in order to secure or change a camera heads adjustment position about axis 4, an adjust feature (31) is provided, which as illustrated can include several detents (30) preferably providing for any number of set locking positions about the axis 4 from a 0-90 degree movement. In use, the axis 4 would be generally parallel to the ground and the camera would be movable vertically for adjustment, preferably by a full 90 degrees of rotational movement. Greater than 90 degrees of movement is contemplated, or less depending on the application. Each of the components of the mount 150 can be made separately or integrally, preferably along with a housing 22 that provides a cavity for receiving a 10-AA battery device.

In order to permit rotational movement and adjustment, the mounting device comprises a tab 153 with an aperture 154 as shown in FIG. 8G. The tab 153 is designed to fit within the hinge portion 20 of the camera head 100. Preferably, the tab 153 and the hinge portion 20 are made to be complimentary to one another and to permit rotational movement relative to one another. For example, the tab 153 can be formed with hub portions that snap fit within similar slots of the hinge portion to define rotational motion. Or, a pivot pin (not shown) may be used as passed through apertures of both components to facilitate such movement. As the detents 30 are arranged radially with respect to the aperture 154, the tension screw 2 and lock element 3 can be manipulated to lock the camera head 100 in any of the detent defined positions. As above, it is contemplated that a friction lock can instead be utilized for locking at any location within a desired range of movement. It is noted that the complimentary design of the hinge portion 20 and the tab 153 can also be designed to provide rotational limits for defining such a range of motion. As shown, the camera head 100 can be fully rotated upward to a position substantially against the mounting device 150. Preferably at this position, the aperture 27 of the mounting device 150 would be aligned with an aperture 160 of the camera head as preferably also provided on the element 152 of the camera head 100. A 90 degree rotation would allow the camera's field of view to be pointed from an up position that looks substantially horizontally to a down position that views straight to the ground.

System/apparatuses 120, 140 preferably will mount to both vertical and horizontal structures such as trees, tree branches or flat buildings. Preferably, but not necessarily, the apparatus 120, 140 may be camouflaged.

Figure 10B:
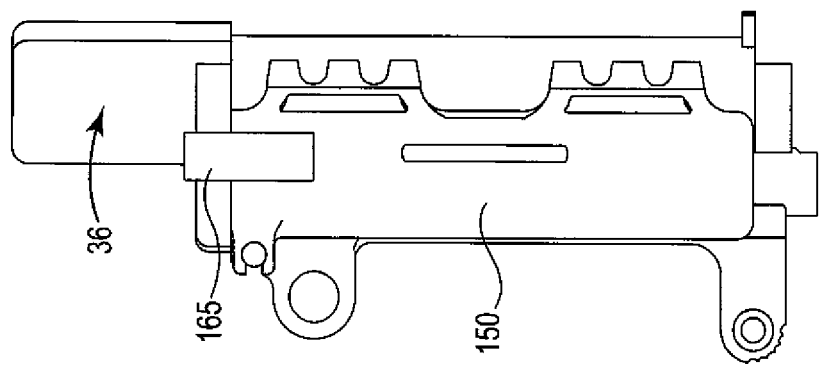
FIG. 10B is a side elevation view as viewed from the right side of the apparatus as depicted in FIG. 8A.

Preferably a removable battery lid can be provided that will slide into a slot (29) from either side. As shown in FIGS. 11A-C and 12A-C, battery lids 38 and 40 can include pins 163 and 164 respectively that can slide within the slot 29 so that the battery lids are rotatable relative to the mounting device 150. Preferably also, cam action slots (26) are provided to the mounting device 150 that can be used to pin and secure battery cap latches 165, see FIGS. 10 A and B, that can provide a downward force for holding a batter lid 38 or 40 in place by rotation of the latches 165.

Preferably there is an alignment feature (23) which is located directly in the center and lower end on the back side of the 10-AA battery housing and is used to align an external Lith-ion battery pack onto a Lith-ion cap housing, as will be described below.

Figure 9A:
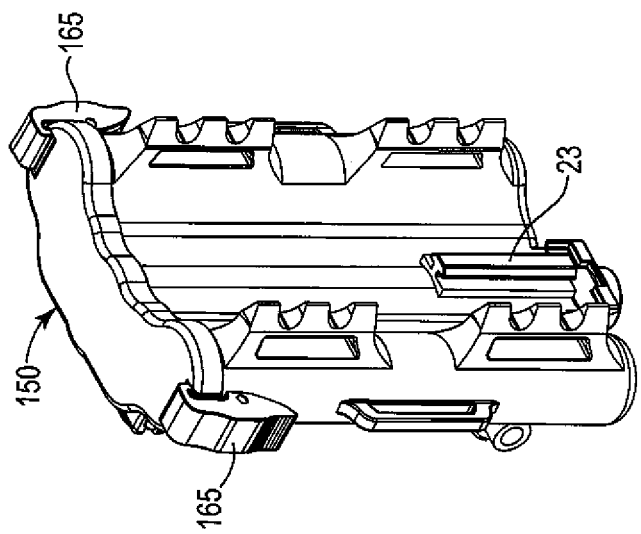
FIG. 9A is a rear perspective view of a self-contained surveillance apparatus/system also in accordance with FIG. 8A of the present invention.
Figure 9C:
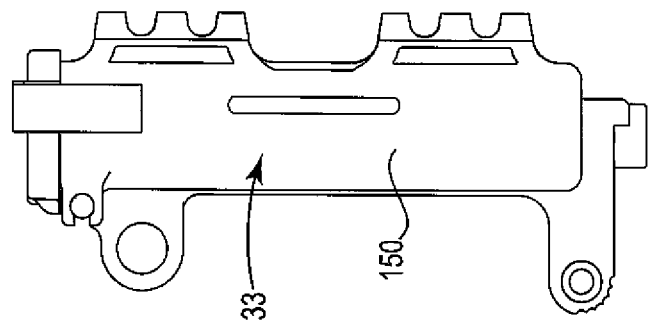
FIG. 9C is a side elevation view as viewed from the left side of the apparatus as depicted in FIG. 8A.
Figure 9B:
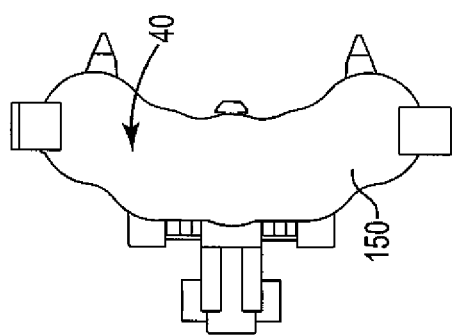
FIG. 9B is a top plan view of the apparatus of FIG. 9A.

FIGS. 9A, 9B, 9C, are a representation of system/apparatus 140 where an external Lith-ion battery pack is not used. A battery cap 40 can be used when the external Lith-ion supply is not. Preferably the locking latches 165 will work to be usable with either battery cap 38 or 40. The mounting device 150 serves as both a support for the camera head and also provides a water proof compartment for the internal batteries.

Figure 10A:
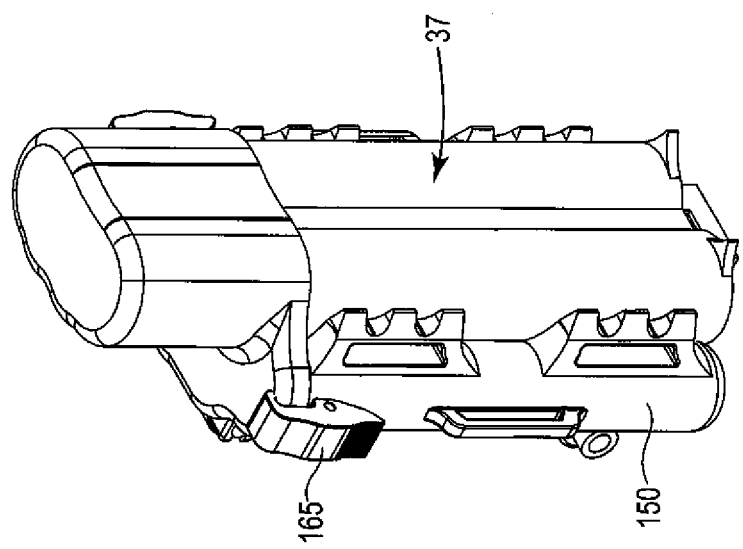
FIG. 10A is a rear perspective view of a self-contained surveillance apparatus/system also in accordance with FIG. 8A of the present invention.

Preferably system/apparatus 140 has the option to use both power supplies. FIG. 10A is not just limited to an external 18650 Lith-ion pack (37) mounted to the back side of the 10-AA battery housing. There are multiple advantages to this external Lith-ion power supply.

They are, but not limited to, up to 3 times the battery life as comparable to AA alkaline internal power supplies, unlike alkaline batteries Lith-ion is not affected by the ever changing weather conditions. In fact, alkaline batteries will lose significant capacity in cold climates where Lithium batteries are not affected. Whereas other previous external power supplies need to be connected by a power cable and if used for security is a lot more noticeable and harder to hide. Whereas other power cord supplied external battery systems used to monitor wildlife are always at risk the cord may be chewed off or frayed from mice or squirrels. Whereas the battery mounting options and other ways to secure and protect the battery and cable are very limited. Preferably there is a special battery cap 38 that can be included with an external Lith-ion pack (36) that can be provided separately.

FIGS. 21A, 21B, 21C, 21D represent a Lith-ion battery housing 88, preferably which includes two springs (89) that apply constant downward pressure to a spring loaded slide locking feature (90) that preferably locks into the back of the AA battery housing. There is also an alignment slot (91) that not only aligns the battery pack during installation to the mounting device 150 utilizing the alignment element 23 (FIG. 9C) but also prevents any side movement when the complete system is installed to a tree, post or building. Preferably four bark bitters (92) which are part of the battery housing help anchor the complete camera system to a tree or similar structure. Preferably the Lith-ion batteries are not limited to any specific size or quantity, in this case four 18650 Lith-ion batteries (93) make up the pack. These batteries can be removed and charged separately or they can be charged together with in the battery housing as one unit with a charger that is part of the Lith-ion battery combo package.

Figure 13B:
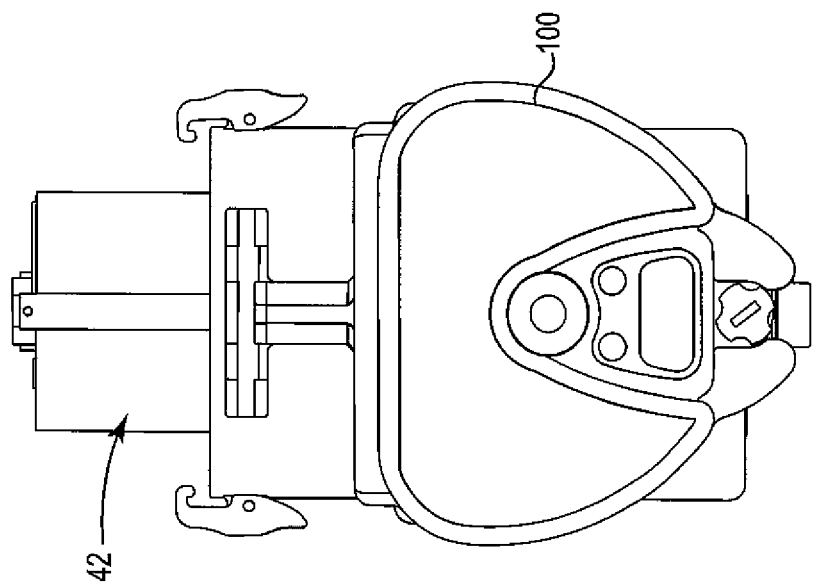
FIG. 13B is a front elevation view of the apparatus of FIG. 13A.
Figure 13A:
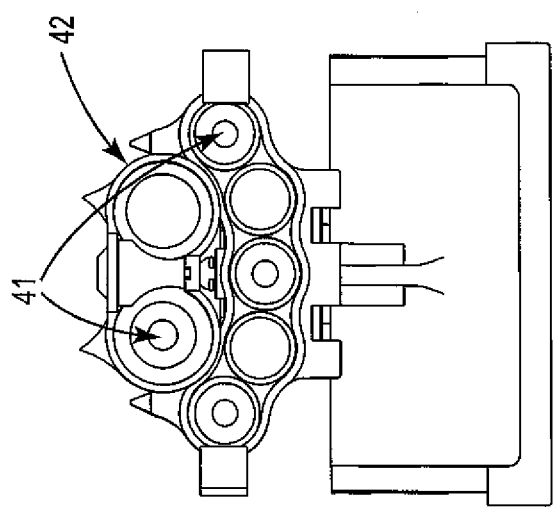
FIG. 13A is a top plan view of a self-contained surveillance apparatus, such as similar to that depicted in FIG. 8A.

There are preferably two different removable battery caps that can be used with system/apparatus 140 depending on the needs of the consumer and the desired battery life, climate and conditions the system is being used in. Battery cap 38 is shown in FIGS. 11A, 11B, 11C and represent both Lith-ion, and AA-battery options. There are several battery options and combinations that can be used with this cap designs. For example preferably both combinations can be used at the same time with the camera electronics recognizing the Lith-ion pack as the primary source and the 10-AA as the secondary power source. Referencing the information from the battery monitor 40, as described above, the microcontroller 46 can automatically switch over preferably to the 10-AA supply when the Lith-ion pack is depleted. The system can also be run preferably on the 10-AA supply with no Lith-ion pack present. It can also operate with just the Lith-ion pack with no 10-AA power source. The battery caps 38 or 40 are preferably hinged as described above which allows the cap to rotated 90 degrees backwards towards the camera head 100. It can then be aligned with the slot 28 and will slide either right or left for removal. The second cap 40 is shown in FIGS. 12A, 12B, 12C and preferably will only work with the 10-AA power supply. This cap 40 is designed for system/apparatus 140, for example. The cap removal and hinge are the same as described above. FIG. 13A shows the placement of both 10-AA and Lith-ion batteries (42, 41).

Figure 14B:
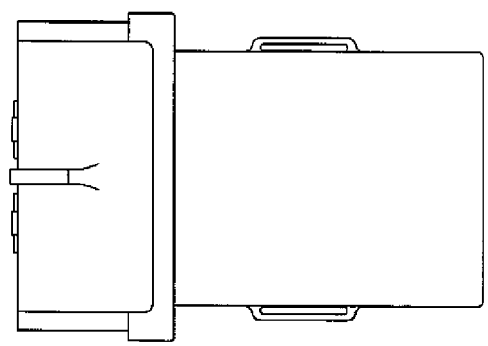
FIG. 14B is a front elevation view of the apparatus of FIG. 14A.
Figure 14C:
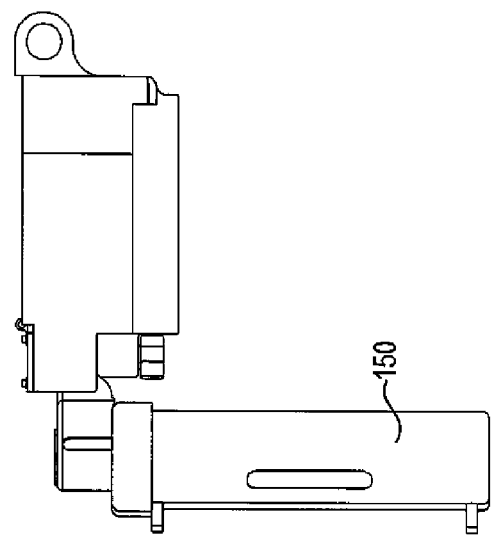
FIG. 14C is a side elevation view as viewed from the right of the apparatus as depicted in FIG. 14A apparatus.

The embodiment of the present invention system/apparatus 160 is shown in FIGS. 14A, 14B, 14C. Some of these components and features are also shared with system/apparatus 120 and those will become obvious with the explanation and stated drawings below.

Even though this embodiment has several components that are similar to system/apparatus 140 previously described it is uniquely different. Both system/apparatus 120, 160 share a same multi-axis system capable of a full 360 degree horizontal rotation and tilting 0-90 degrees vertically whereas prior art of a somewhat similar inventions have no axis movement and are totally dependent on a second or even third apparatus to accomplish said movement. System/apparatus 160 will also mount to both vertical and horizontal structures such as trees, horizontal tree branches or buildings. Preferably, but not necessarily, the apparatus 160 may be camouflaged.

Figure 15B:
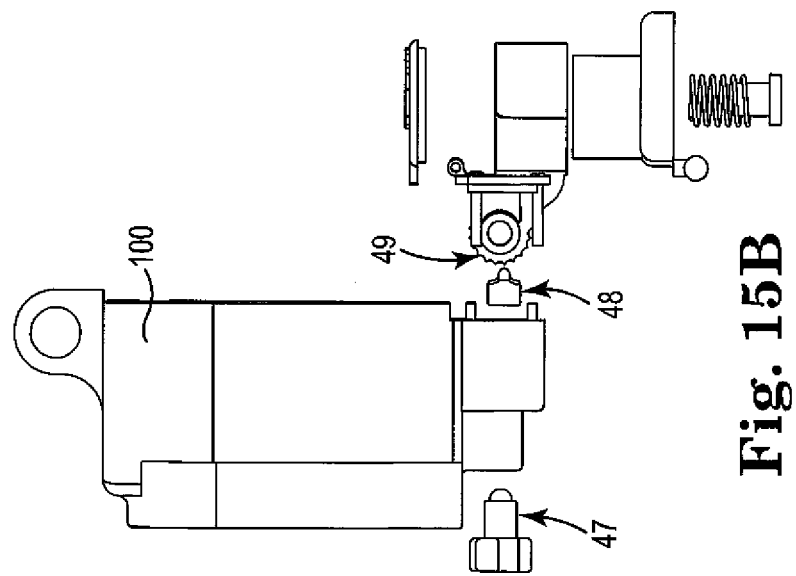
FIG. 15B is a side elevation view exploded as viewed from the left of the apparatus as depicted in FIG. 14A apparatus.
Figure 15A:
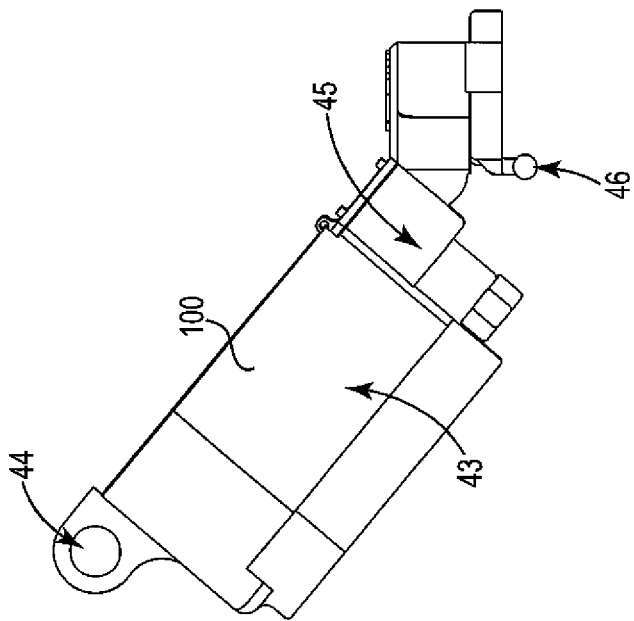
FIG. 15A is a side elevation view as viewed from the left of the apparatus as depicted in FIG. 14A apparatus.

It will become obvious to those familiar with prior art this system has virtually no mounting limitations. Unlike system/apparatus 140 both system/apparatus 120, 160 as shown do not have the capability of using an external Lith-ion power supply and rely upon 10-AA batteries to power the system. It is contemplate, however, that these systems 120 and 160 could as well utilize an external power source as well as similarly combined as described above for the system 140. FIGS. 15A, 15B, 15C also represent camera components similar to system/apparatus 120, 140 those are preferably a security cable lock mounting hole (44), camera head housing (43), locking example (45) preferably between the detents (49) and the threaded spring loaded (47) tension adjuster which applies pressure to the lock (48). Internal components include preferably limited to an infrared panel (50), a printed circuit boards (51), printed circuit board standoffs (52), day/night filter exchanger (53), camera lens (54), lens holder (55), image sensor (56), (PIR) passive infrared motion detector (57), (SD) secure digital socket (58), hinged back cover for the camera head (59), rubber interface buttons and LCD screen (60), mounting screws (61) to secure the hinged back cover and bottom pivot support cover (63) to the camera head housing, water proof rubber cover (64) which allows access to the wire harness, detents (65), a camera pivot head extrusion (66), camera head front glass (67), thread spring tension adjusting screw (68), tension spring (69) for 360 degree ratchet assembly, a battery cover pivot and removable slot (71), a battery compartment and mounting housing (70).

Figure 17A:
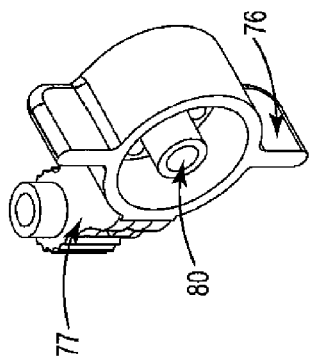
FIG. 17A is front perspective elevation view of a device component of the apparatus as depicted in FIG. 14A.
Figure 17B:
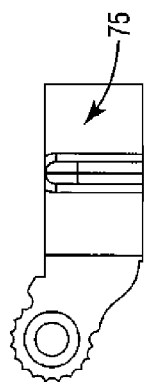
FIG. 17B is a side elevation view of the device as depicted in FIG. 17A.
Figure 17C:
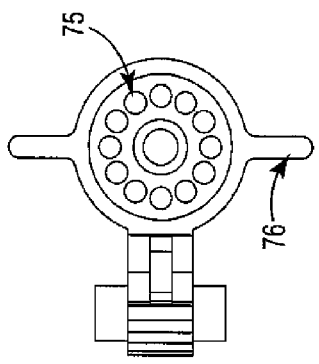
FIG. 17C is bottom plan view of the device as depicted in FIG. 17A.
Figure 16A:
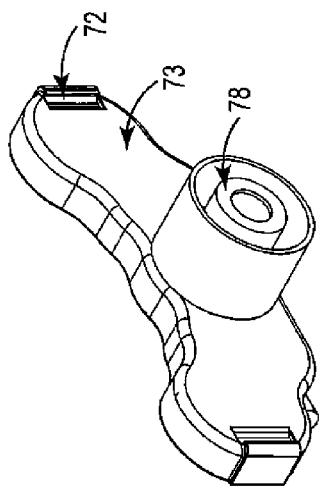
FIG. 16A is a front perspective elevation view of components of the apparatus as depicted in FIG. 14A apparatus.
Figure 16B:
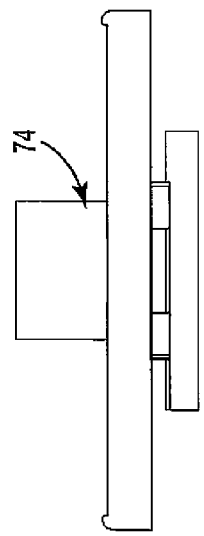
FIG. 16B is a front elevation view of the device as depicted in FIG. 16A.
Figure 16C:
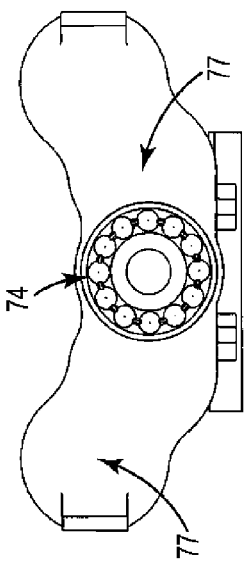
FIG. 16C is top plan view of the device as depicted in FIG. 16A.

Preferably a 360 degree rotational cap design 73 is also shared between system/apparatus 120, 160 as they are shown in FIGS. 16 and 17 A, B, C for permitting rotational movement and thus adjustment of a camera head 100 about a vertical axis for horizontal positioning. The battery cap 73 and camera head can be secured to the battery compartment with preferably a latch that when engaged with the cap can nest in detents (72). Located within a collar extending from the cap are a series of preferably twelve round detents (74) that can be equally spaced on center so as to form a bottom of a step adjustment assembly. Located on the camera support arm (77) are a series of a similar number as there are round detents 74 of half round ball protrusions 75 that are also preferably equally spaced on center so as to form a top half of the 360 degree rotational step adjustment assembly. A threaded boss 80 can then be inserted into battery cap housing (78) where said tension spring 69 is inserted and held in place with said threaded adjusting screw 68. Preferably the 360 rotational step adjustment assembly can then be adjusted by simply tightening or loosening the tension screw 68 which applies pressure to said tension spring 69. The threaded boss is allowed to slide freely up and down as the said half round ball protrusions move from one detent to another following preferably a circular pattern as the assembly rotates. Instead of grabbing the camera head and twisting to achieve the desired rotation a pair of adjusting wings (76)

can be provided as may be added to the camera support arm. The AA-battery contacts provided as described below and are used to supply power the camera head.

Several other camera parts from system/apparatus 160 are shared by both system/apparatuses 120, 140, those are depicted in FIGS. 18A, 18B, 18C. A locking mechanism preferably is designed into said back cover 82 so as to permit the back cover to be opened and closed. When the cover is opened, access is preferably provided to a control panel below the cover 82, which may include any number of control buttons and a display such as an LCD screen. The cover 82 is preferably hinged as shown by the hinge portion of the camera head where a cover portion is secured in place such as by screws. From the hinges, the back cover 82 can pivot so as to open up and expose the control panel. A latch assembly is preferably provided to secure the back cover in a closed position and to allow the back cover 82 to be opened. A latch tab 83 can be pulled by an user to slide a latch 85 as can be slidingly constrained within guide structure along the back cover 82 near its free edge. Springs 84 are shown for biasing the latch 85 toward an engaged or latched position. Pulling the tab 83 causes the latch 85 to slide against the spring bias of the springs 84 as guided by the guide structure of the back cover 82. When the latch 85 is disengaged from an edge recess of the camera head, the back cover can be pivoted about the hinges to an open position.

Figure 19:
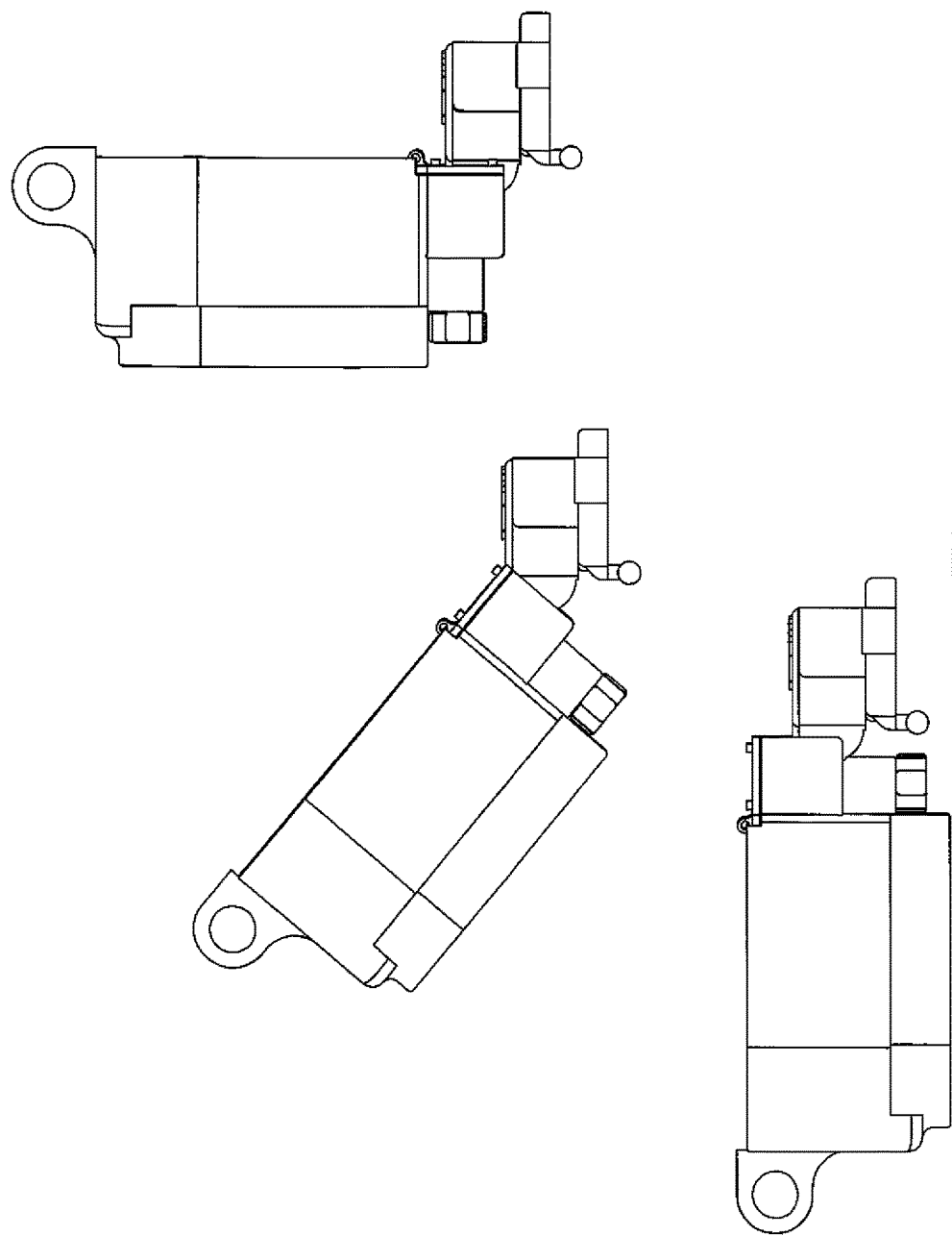
FIG. 19 is right side view of components of the apparatuses as depicted in FIGS. 6A, 14A, apparatus showing various positional movements.

Different vertical camera angles about a horizontally oriented axis are shown in FIG. 19, and different horizontal degrees of rotation about a vertical axis are shown in FIG. 20. Using both axis together, one can easily create an almost unlimited number of camera combinations. Unlike current camera designs that require the aid of a second or even third apparatus to achieve any vertical or horizontal movement system/apparatuses 120 and 160 do not.

Figure 7C:
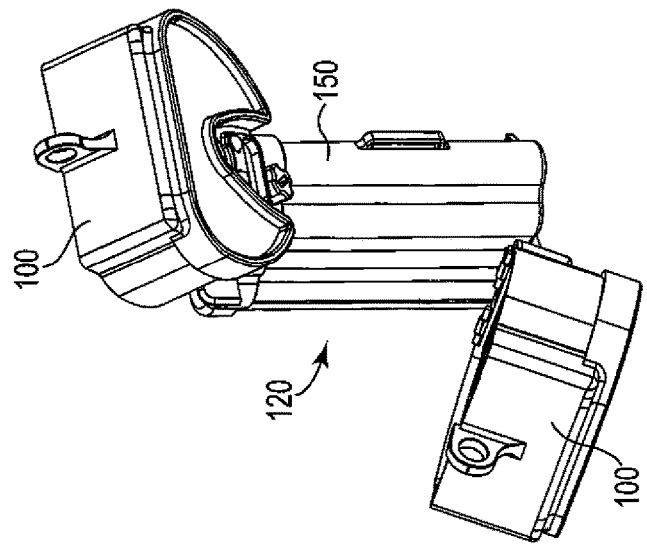
FIGS. 7A, 7B, 7C are a continuation of further detailed views and positioning variations of a self-contained surveillance apparatus/system in accordance with FIG. 6A.
Figure 7B:
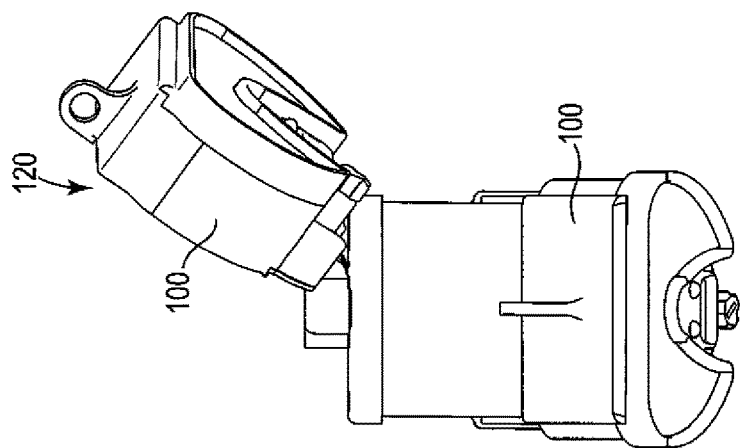
Figure 7A:
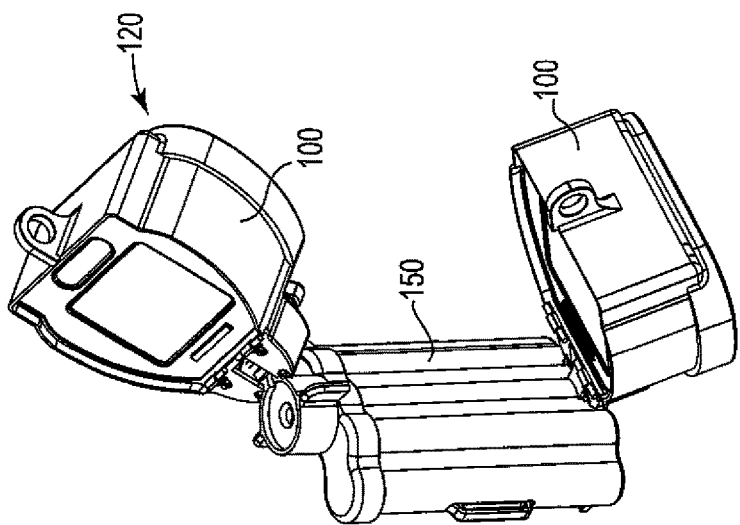

The embodiment of the present invention system/apparatus 120 in FIG. 6A brings together all of the different degrees of movement, camera components, camera heads, battery compartment main housing, and batteries. System/apparatus 120 is a hybrid system created by combining system/apparatus 140, a camera head single axis 90 degree vertical support which is associated with the battery compartment/housing, system/apparatus 160 by adding a battery cap, a camera support arm, support components which allow for both vertical and horizontal degrees of movement as previously described. This combination of the other described embodiments above allows for system/apparatus 120 as shown in FIGS. 7A, 7B, 7C to have completely interchangeable and removable parts, unlimited axis angles and rotation without the aid of one or more additional support apparatuses, multiple recording camera heads and twice amount of images and coverage area of conventional fix single camera head systems. Preferably, but not necessarily, the apparatus 120 may be camouflaged.

Figure 22C:
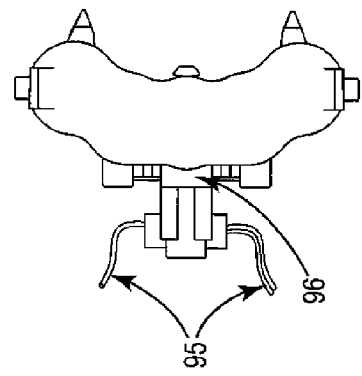
FIGS. 22A, B, C, D represents different views of a power supply wire harness path such as is depicted in both FIGS. 8A, 6A.
Figure 22D:
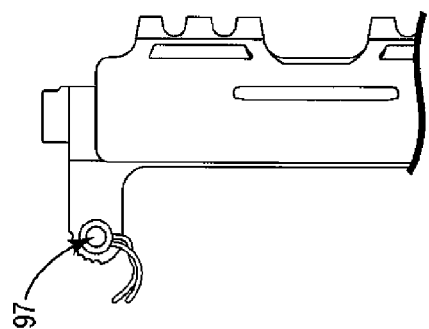
Figure 22A:
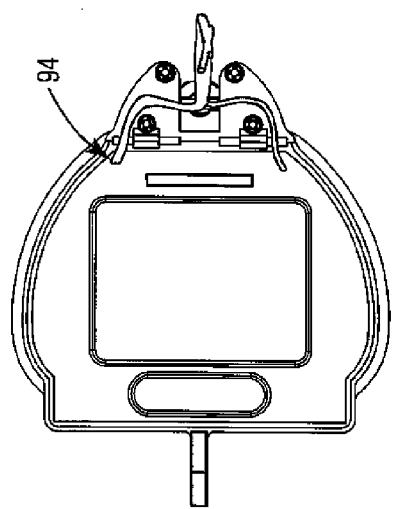
Figure 22B:
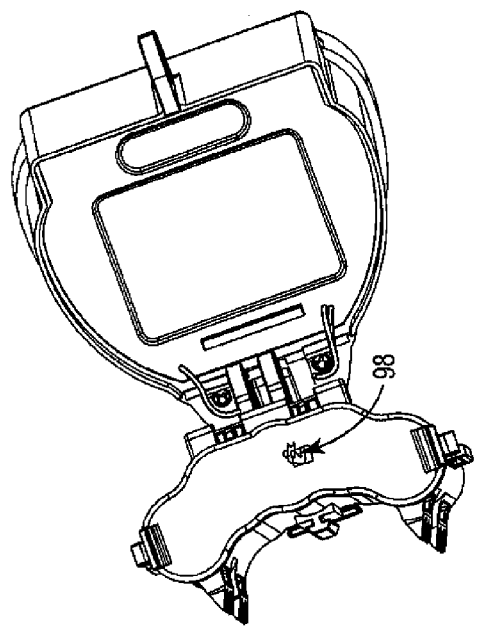
Figure 23A:
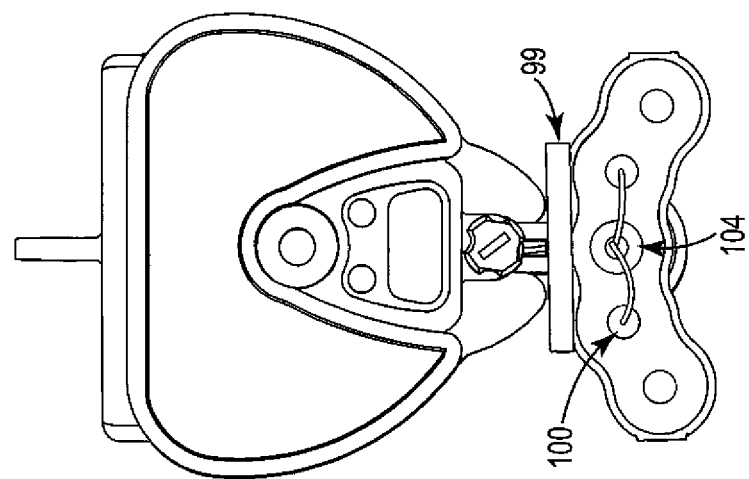
FIGS. 23 A, B, represent different additional views of a power supply wire harness path such as is depicted in both FIG. 6A, 14A.

Unlike conventional surveillance/game/home/wildlife camera systems where the camera is part of one single housing including its battery power source which then mounts to a tree or post, a wire harness (95) of the present invention can be routed for connecting one or more camera heads to the battery compartment while allowing for complete 90 degree vertical movement about a horizontal axis and/or 360 degree rotational movement about a vertical axis, as are described above in the various embodiments of the present invention. Preferably a wiring harness should be enclosed, water proof and also concealed from anything that could chew or fray wires such as squirrels or mice. Preferably the harness is connected so as to provide power to a printed circuit board 94, as schematically noted as below the back cover in FIG. 22A. The wiring harness preferably connects from the printed circuit board within the camera head, as shown in FIG. 22A, and is run into the hinge portion 20 thereof where it is then run into openings of the hub or tab portions (such as shown at 96 and 97 in FIGS. 22C, D) that are used for rotational connection of the camera head to the mounting device either about a vertical or horizontal axis as described above. The wiring can be run within a hollow interior of these components, as also shown in FIG. 23A. Preferably the harness then continues up thru a hole in the bottom of the battery compartment (98) where it connects to the positive and negative battery terminals to complete the circuit from the camera head to the battery power supply.

System/apparatus 120 also shares and incorporates the same harness and wire path design. See FIGS. 22A, 22B, 22C, 22D.

Figure 23B:
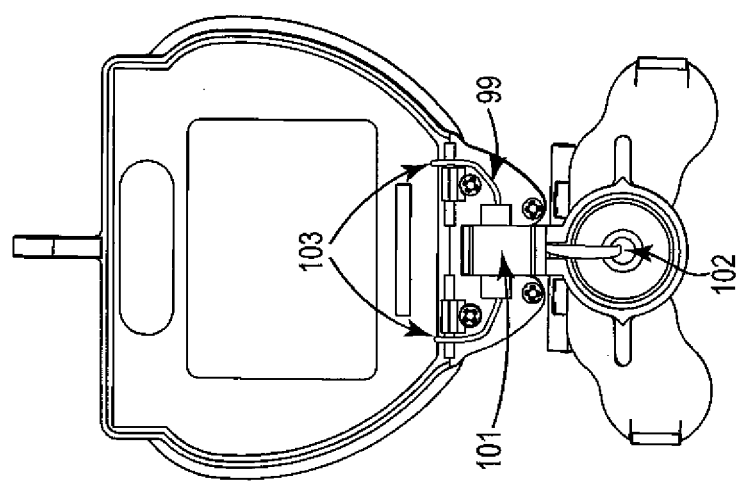
Figure 25D:
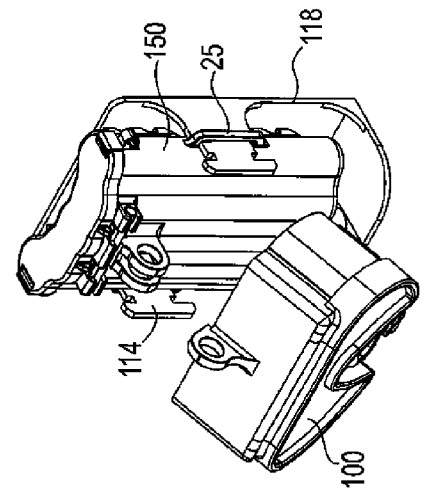
FIGS. 25A, B, C, D, E are various views of an apparatus of FIGS. 8A, B, C, D without an external battery provided and that is positioned on a quick mount bracket as in accordance with another aspect of the present invention.
Figure 25C:
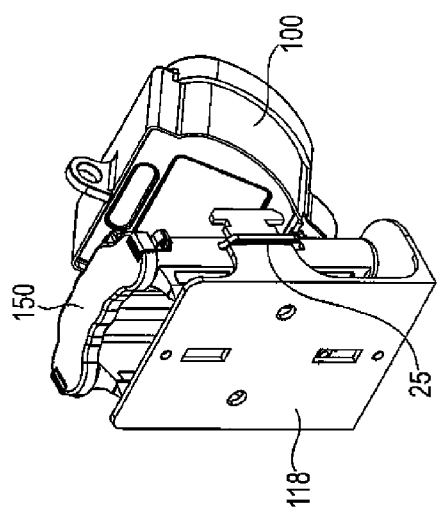
Figure 25E:
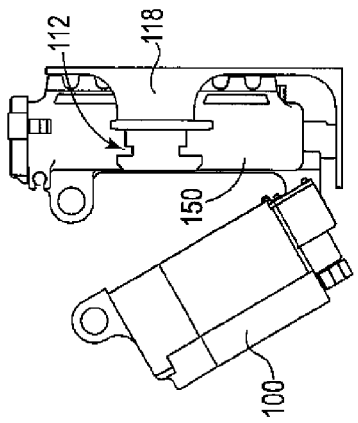
Figure 25A:
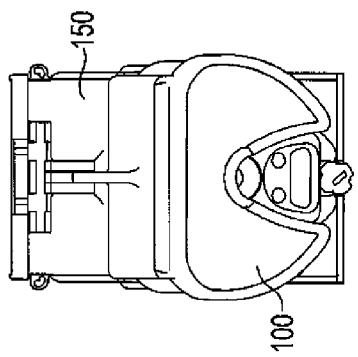
Figure 25B:
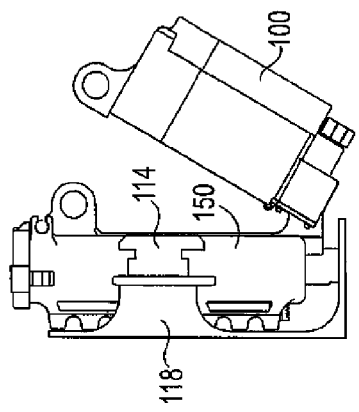
Figure 26D:
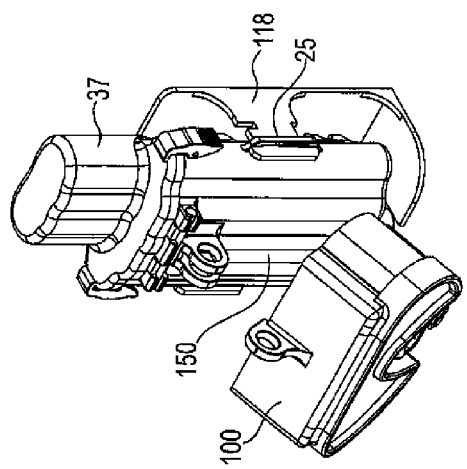
FIGS. 26A, B, C, D, E are various views of an apparatus of FIGS. 8A, B, C, D apparatus that is provided but with an external battery and that is positioned on a quick mount bracket as in accordance with another aspect of the present invention.
Figure 26E:
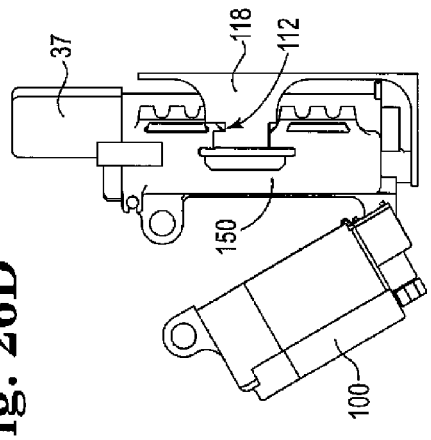
Figure 26A:
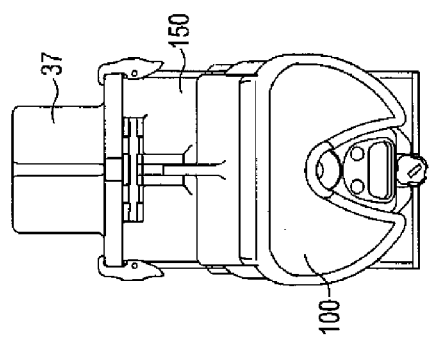
Figure 26C:
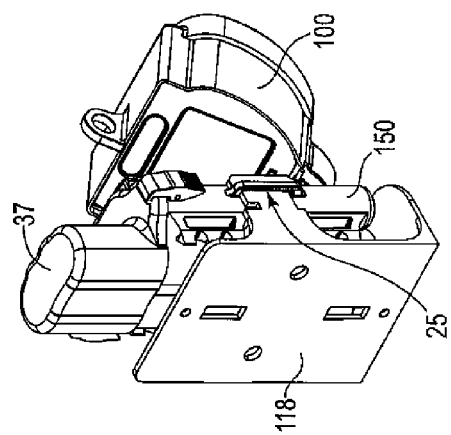
Figure 26B:
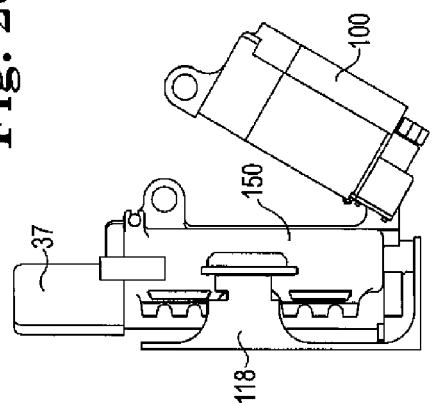

Depicted in system/apparatus 160 FIGS. 23A, 23B, preferably just how such a required wire harness (99) and the wire path would work connecting both the camera head to the battery compartment and still allowing for complete (90) degree vertical and 360 degree horizontal axis movement. It is also important to note that the harness is preferably totally enclosed, water proof and also protected from anything that could chew or fray wires such as squirrels or mice. Preferably the harness is first connected to a printed circuit board (103), which is not just limited to one side or opposite sides of the printed circuit board. The wiring harness is then preferably routed down through each side of the said camera pivot arms and into a hollow inside of the camera support arm hub or truss (101) which is shown as attached to the top of the battery cap. The harness then preferably continues down through support arm and enters through a hole 102 in the top of the said 360 degree ball ratchet assembly 120. The harness preferably continues down through said tension spring and said tension adjusting screw assembly (104) where the harness wires are then connected to the positive and negative battery terminals to complete the circuit from the camera head to the battery power supply. As above, effective power transfer can be operatively provided from internal battery sources, and external battery sources for use by the camera head as routed preferably through a printed circuit board in a conventional manner. By routing the wiring through the articulation points, whether about horizontal or vertical axis for movement, effective power transfer is achieved while allowing the desired movements and adjustability between a mounting device and an articulated camera head.

System/apparatus 120 preferably also shares and incorporates the same harness and wire path designs as previously described in system/apparatus 140 and 160. See FIGS. 22A, 22B, 22C, 22D, 23A, 23B.

Depicted in FIGS. 25, 26, 27 is a quick mount detachable and multi-surface mounting bracket 180 that can be used with embodiments of the present invention. Whereas other types of mounting brackets require straps and or metal fasteners to secure a similar apparatus this bracket does not. The quick mount detachable bracket has several different ways it can be mounted. For example, the mounting bracket can be connected to a T-Post using slots 110 that can allow metal bosses, as are typically provided on a T-post, to protrude through the bracket. Next a u-bolt can be inserted into and through holes 113 and then bolted to the bracket and post at the desired height. Mounting to complete flat surfaces can be achieved by using mounting screw holes 111. Once the bracket 180 is mounted to any structure, it is then easy to quickly mount and support a camera apparatus of the present invention in place. Likewise, it is easy to then remove the camera apparatus from the bracket 180 if desired.

Securing the camera apparatus to bracket arms 114 is very quick and user friendly. The camera apparatus is first inserted into the bracket arms 114 at a slight upward angle using the strap mounting slots 25, as are shown in FIG. 8. The next step is to slide the camera apparatus over the outermost extension of the arms 114 until the camera apparatus sits into and locks in place within one of preferably a plurality of desired slot locations 112. The slot location 112 can depend on whether or not the external battery is being used. Once the camera apparatus is set in place, it is effectively supported for use as mounted and can then be adjusted for operation in the any of the manners described above. In FIGS. 25A-E, a camera apparatus comprising a camera head 100 and mounting device 150 are shown as mounted in position to a quick mount bracket 180. The camera apparatus is illustrated as without an external battery pack. As such, the strap mounting slots 25 are shown as positioned within an inner slot 112. As shown in FIGS. 26A-E, a camera apparatus is shown, not only with a camera head 100 and mounting device 150, but also with an external battery pack 37. In this case, the strap mounting slots 25 are shown as positioned within an outer one of the slots 112.

If several different camera locations are desired, multiple brackets 180 can be setup and left at those locations. This allows the user the flexibility using the quick detach system to move cameras apparatuses from one location to another quickly by simply removing the camera apparatus and leaving the bracket, and going to another location that already has a bracket. This also saves a lot of time in setting the camera back to a desired height and having to realign the target area. Preferably, but not necessarily, the apparatus 180 can be made from plastic or metal and may be camouflaged.

Figure 28C:
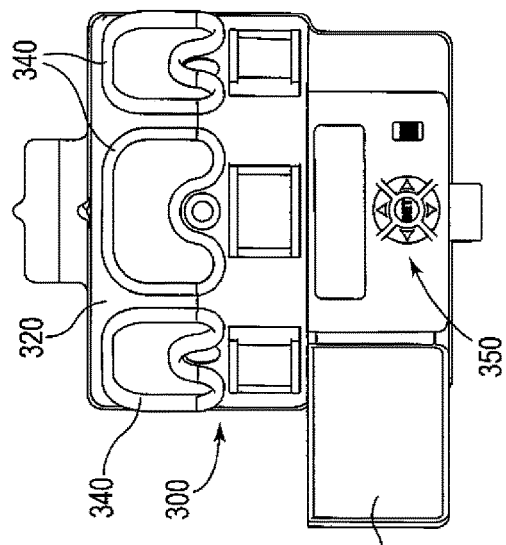
FIG. 28C is a front elevational view of the apparatus of FIG. 28A.
Figure 28A:
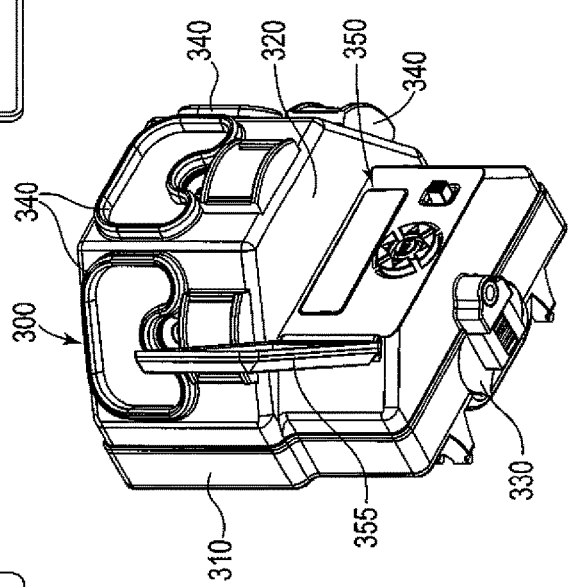
FIG. 28A is a perspective view of yet another embodiment of a remote self-contained surveillance apparatus in accordance with the present invention, wherein multiple cameras are provided within a camera head, as such camera head can be accommodated by a common mounting device and apparatus.

Yet another embodiment in accordance with aspects of the present invention is illustrated within FIGS. 28A, B, C, 29 and 30. This embodiment utilizes similar concept as described above but incorporated within a panoramic camera design. Preferably, such a camera design provides for 180 degrees viewing. Specifically, a camera apparatus 300 can be provided that includes a mounting device 310 along with a camera head 320 that are preferably separable from one another. The camera head 320 and mounting device 310 may be connectable to one another by any mechanical type connection such as utilizing complimentary components that slide and engage with one another or that snap-fit with one another, or that utilize mechanical fasteners that are removable or manipulated such as latches or screws, or the like.

Figure 28B:
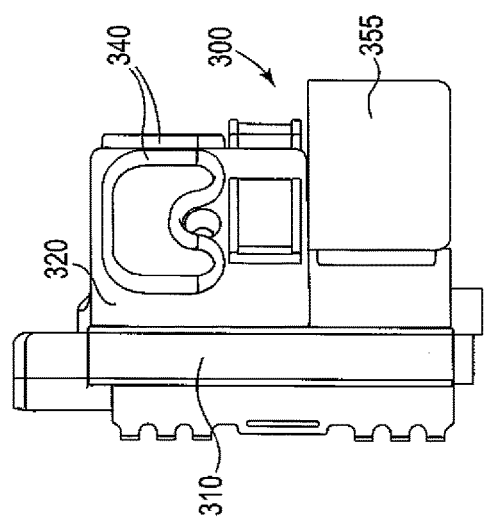
FIG. 28B is a side elevational view of the apparatus of FIG. 28A.
Figure 29:
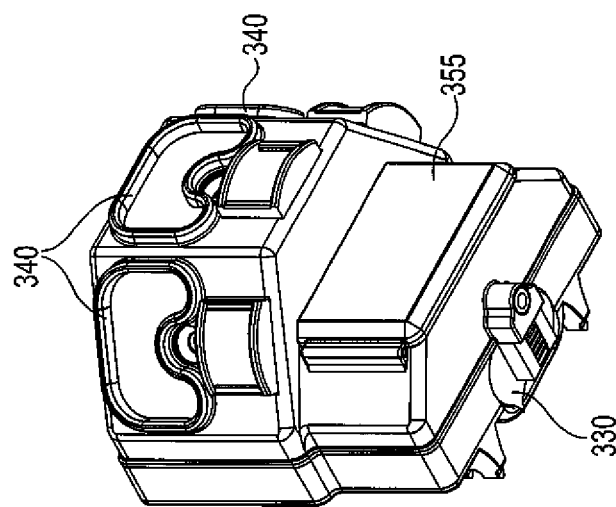
FIG. 29 is a perspective view similar to FIG. 28A, but showing the multiple camera apparatus with a control panel door in a closed position.
Figure 30:
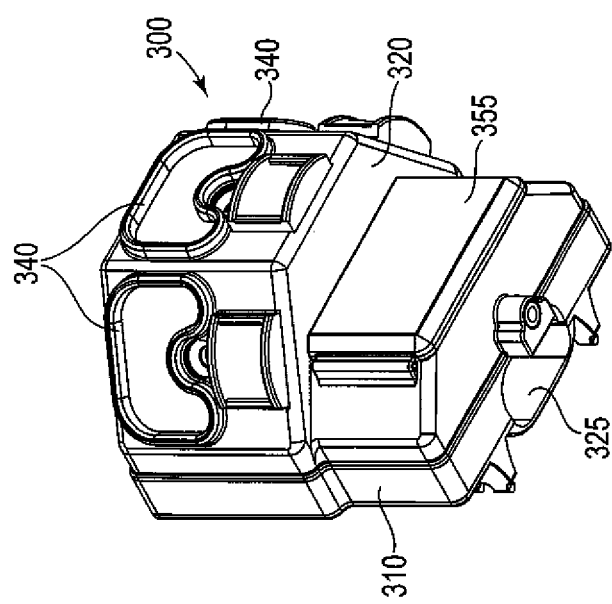
FIG. 30 is a perspective view similar to FIG. 28A, but showing the multiple camera apparatus with the control panel door in a closed position and with an external battery pack removed.

It is preferable that the mounting device 310 provide a housing for batteries in a similar manner as that described above, which batteries could be considered as an internal battery source in the same manner as well. Also, it is preferable to include a means to provide external batteries as well. As shown in FIG. 30, an opening 325 can be provided into the mounting device 310 for creating an internal cavity for receiving an external battery pack 330. FIGS. 28 and 29 illustrate the camera apparatus 300 with an external battery pack 330 inserted within and through the opening 325. The internal and external battery sources can be operatively connected with the camera head 320 for camera functionality in a similar manner as described above and to allow switching from one source to the other as needed.

The camera head 320 itself preferably comprises plural cameras 340 that positioned in a desired manner relative to one another. Each camera 340 may be constructed in a manner as described above with respect to those single-camera camera heads 100 described above with similar components and functionality. Preferably, the cameras 340 are formed as connected together to create the camera head 320. It is, however, contemplated that these cameras 340 could instead be adjustable to one another, particularly in a vertical manner with one or more of the cameras 340 being movable about a horizontal axis of rotation. Any of the techniques discussed above for providing such movement can be utilized.

According to the illustrated arrangement of cameras 340, three cameras 340 provide a full 180 degree viewing of a location based upon the set up of the camera assembly 300. These cameras 340 can be controlled to function independently of one another or together based upon sensed conditions. For example, each camera 340 may include its own motion sensor, as described above, which sensor can trigger one, two, or all three cameras to take an image. Each camera 340 may have its own electronic circuitry for functionality, or a common control circuit can be instead utilized.

Preferably also, a control panel 350 can be provided as shown for example in FIGS. 28A and C. A display panel and control buttons can be provided as shown as part of the control panel 350 for controlling or setting up functionality of each of the cameras 340. For example, the buttons can be used to scroll through each of the camera and controlled functionality of each camera 340. A closure door 355 is also shown that may be also provided for the purpose of closing off access to the control panel 350 as desired. Such a door can have any kind on known or developed lock system as well.

There have been illustrated in the accompanying drawings and described herein above several of the unique and novel embodiments of the present invention which can be practiced and constructed in many different configurations, arrangements of components, sizes, and shapes.

It should be understood that many changes, modifications, variations, and other uses and applications will become apparent to those persons skilled in this particular area of technology and to others after having been exposed to the present patent specification and accompanying drawings.

Any and all such changes, modifications, variations and other uses and applications which do not depart from the spirit and scope of the present invention are therefore covered by and embraced within the present invention and the patent claims set forth herein below.

The invention claimed is:

1. A remote self-contained surveillance apparatus, comprising:
    a mounting device, the mounting device comprising a first battery compartment for containing batteries as a first power source, the mounting device also including engagement structure for mounting the mounting device at a desired remote location;
    a camera head that is movably connected with the mounting device by a hinge portion that permits adjustability of the camera head relative to the mounting device about at least a single axis, the camera head comprising a camera controller within the camera head for controlling an imaging device of the camera, and a presence sensor for determining the presence of an object within a field of view of the camera imaging device, and for controlling the camera imaging device to record an image based upon an activation by the presence sensor;
    wherein the camera controller, imaging device and presence sensor within the camera head are operatively electrically connected to battery terminals within the first battery compartment of the mounting device by a wiring harness so as to provide power to operate the camera controller and the imaging device from batteries as a first power source when provided within the first battery compartment and so that the camera head is fully operable from batteries as a first power source when provided within the first battery compartment, and further wherein the camera head can be changed in position relative to the mounting device by way of the hinge portion so that the camera head can be adjusted in position without changing the position of the first battery compartment.

2. A remote self-contained surveillance apparatus, comprising:
a mounting device, the mounting device comprising a first battery compartment for containing batteries as a first power source, the mounting device also including engagement structure for mounting the mounting device at a desired remote location;
a camera head that is movably connected with the mounting device by a hinge portion, the camera head comprising a camera controller within the camera head for controlling an imaging device of the camera, and a presence sensor for determining the presence of an object within a field of view of the camera imaging device, and for controlling the camera imaging device to record an image based upon an activation by the presence sensor;
wherein the camera controller, imaging device and presence sensor within the camera head are operatively electrically connected to battery terminals within the first battery compartment of the mounting device by a wiring harness so as to provide power to operate the camera controller and the imaging device from a first power source when provided within the first battery compartment so that the camera head is fully operable from a power source within the first battery compartment, the apparatus further comprising a second battery compartment that is removably connected to the mounting device and that is also selectively electrically operatively connectable with the camera controller so that either a first power source or a second power source can be used to make the camera head fully electrically operable.

3. The apparatus of claim 2, wherein the camera controller includes a microcontroller for monitoring the power supply from both first and second power sources when provided within the first and second compartments, respectively, and for controlling power supply to the camera controller from one to the other based upon battery voltage within the first and second power sources.

4. The apparatus of claim 1, wherein the mounting device supports a plurality of camera heads that are movably mounted to the mounting device and that are each operatively connectable to a first power source when provided within the first battery compartment so that the plural camera heads are fully operable from a power source within the first battery compartment.

5. The apparatus of claim 4, wherein one camera head is adjustably movable about a horizontal axis so as to allow the camera head to be locked in position throughout a vertical range of movement.

6. The apparatus of claim 5, further wherein another camera head is adjustably movable about a vertical axis so as to allow the other camera head to be locked in position throughout a horizontal range of movement.

7. The apparatus of claim 6, wherein at least one of the camera heads is adjustably movable about a horizontal axis so as to allow the camera head to be locked in position throughout a vertical range of movement and is adjustably movable about a vertical axis so as to also allow the camera head to be locked in position throughout a horizontal range of movement.

8. The apparatus of claim 1, wherein the camera head further comprises an infrared emitting source that is also controlled by the camera controller for emitting infrared radiation based upon a sensing of light or dark conditions by a sensor also connected with the camera controller.

9. The apparatus of claim 8, wherein the presence sensor comprises a passive infrared sensor.

10. The apparatus of claim 9, further comprising an SD card socket connected with the camera controller for storage ability of images to an SD card.

11. The apparatus of claim 10, further comprising a second microcontroller that is operatively connected with a control panel allowing input by a user to set camera functions.

12. A remote self-contained surveillance apparatus, comprising: a mounting device, the mounting device comprising a first battery compartment for containing batteries as a first power source, the mounting device also including engagement structure for mounting the mounting device at a desired remote location; a plurality of individual camera heads with each camera head being connected with the mounting device by a hinge portion that permits adjustability of the camera head relative to the mounting device about at least a single axis and at least one of the camera heads being movable relative to another camera head, each camera head comprising a camera controller within the camera head for controlling an imaging device of the camera, and a presence sensor for determining the presence of an object within a field of view of the camera imaging device, and for controlling the camera imaging device to record an image based upon an activation by the presence sensor; wherein the camera controller, imaging device and presence sensor within each of a plurality of camera heads are operatively connected to battery terminals within the first battery compartment of the mounting device by a wiring harness so as to provide power to operate the camera controller and the imaging device from batteries as a first power source when provided within the first battery compartment and so that the plural camera heads are fully operable from batteries as a first power source when provided within the first battery compartment, and further wherein a plurality of the camera heads can be changed in position relative to the mounting device by way of its respective hinge portion so that the camera head s can be adjusted in position without changing the position of the first battery compartment.

13. The apparatus of claim 1, wherein the wiring harness is routed through the hinge portion so as not to be accessible from outside the mounting device and camera head.

14. The apparatus of claim 1, wherein the first battery compartment includes a removable lid to provide access to within the first battery compartment for inserting and replacing one or more batteries.

15. The apparatus of claim 2, wherein the first battery compartment includes a removable lid to provide access to within the first battery compartment for inserting and replacing one or more batteries, and the second battery compartment includes a removable lid to provide access to within the second battery compartment for inserting and replacing one or more batteries.

16. The apparatus of claim 12, wherein the wiring harness is routed through the hinge portions so as not to be accessible from outside the mounting device and camera heads.

* * * * *